United States Patent
Yang et al.

(10) Patent No.: US 11,599,572 B2
(45) Date of Patent: Mar. 7, 2023

(54) METHOD, APPARATUS, AND SYSTEM FOR DATA COLLECTION, TRANSFORMATION AND EXTRACTION TO SUPPORT IMAGE AND TEXT SEARCH OF ANTIQUES AND COLLECTABLES

(71) Applicants: Rui Yang, Edison, NJ (US); Eric Wang, Edison, NJ (US)

(72) Inventors: Rui Yang, Edison, NJ (US); Eric Wang, Edison, NJ (US)

(*) Notice: Subject to any disclaimer, the term of this patent is extended or adjusted under 35 U.S.C. 154(b) by 3 days.

(21) Appl. No.: 16/247,628

(22) Filed: Jan. 15, 2019

(65) Prior Publication Data

US 2020/0226176 A1 Jul. 16, 2020

(51) Int. Cl.
| | |
|---|---|
| *G06F 16/58* | (2019.01) |
| *G06N 5/00* | (2023.01) |
| *G06F 16/33* | (2019.01) |
| *G06F 16/55* | (2019.01) |

(52) U.S. Cl.
CPC ...... *G06F 16/5866* (2019.01); *G06F 16/3334* (2019.01); *G06F 16/55* (2019.01); *G06N 5/00* (2013.01)

(58) Field of Classification Search
CPC .. G06F 16/3334; G06F 16/55; G06F 16/5866; G06F 16/532; G06F 16/583; G06F 16/953; G06N 5/00; G06N 5/022
USPC ........................................................ 707/722
See application file for complete search history.

(56) References Cited

U.S. PATENT DOCUMENTS

| | | | | |
|---|---|---|---|---|
| 6,325,292 | B1* | 12/2001 | Sehr | G07F 17/42 235/487 |
| 8,977,603 | B2* | 3/2015 | Pate | G06Q 30/0627 706/14 |
| 9,646,079 | B2* | 5/2017 | Bierner | G06F 16/951 |
| 10,902,051 | B2* | 1/2021 | Hu | G06F 16/55 |
| 2002/0180997 | A1* | 12/2002 | Rozzi | H04N 1/603 358/1.9 |
| 2004/0015427 | A1* | 1/2004 | Camelio | G06Q 30/06 705/35 |
| 2007/0155510 | A1* | 7/2007 | Galvin | G11B 20/00086 463/43 |
| 2007/0156268 | A1* | 7/2007 | Galvin | H04N 21/8352 700/94 |
| 2007/0168064 | A1* | 7/2007 | Galvin | G11B 20/00173 705/26.1 |

(Continued)

*Primary Examiner* — Sheree N Brown
(74) *Attorney, Agent, or Firm* — Walter J. Tencza, Jr.

(57) ABSTRACT

Generating a knowledge base in a database, the knowledge base including a first field which specifies a plurality of known brands of a plurality of known objects, a second field which specifies a plurality of known categories corresponding to the plurality of known objects, and a third field which specifies a plurality of sets of known image-based parameters of the plurality of known objects; receiving in one or more computer memories an indication of a brand, an indication of a category, and an image-based description parameter for a particular object; comparing, the indications of the brand, the category, and the image-based description parameter for the particular object with one or more of the plurality of known brands, known categories, and sets of known image based parameters, respectively, and providing an indication of whether the particular object is one or more of the plurality of known objects, based, on the comparisons.

11 Claims, 23 Drawing Sheets

(56) References Cited

U.S. PATENT DOCUMENTS

| | | | | |
|---|---|---|---|---|
| 2007/0185765 A1* | 8/2007 | Radcliffe | G06Q 30/02 | 705/14.27 |
| 2008/0177405 A1* | 7/2008 | Galvin | A47F 9/048 | 700/94 |
| 2008/0291020 A1* | 11/2008 | Rodgers | G06Q 10/08 | 340/572.1 |
| 2009/0154665 A1* | 6/2009 | Galvin | G06F 21/64 | 379/88.17 |
| 2013/0297625 A1* | 11/2013 | Bierner | G06F 16/33 | 707/754 |
| 2014/0337472 A1* | 11/2014 | Newton | H04L 65/612 | 709/217 |
| 2014/0344391 A1* | 11/2014 | Varney | H04L 47/822 | 709/213 |
| 2014/0344399 A1* | 11/2014 | Lipstone | H04L 41/509 | 709/217 |
| 2014/0344400 A1* | 11/2014 | Varney | H04L 45/745 | 709/217 |
| 2014/0344401 A1* | 11/2014 | Varney | H04L 65/612 | 709/217 |
| 2014/0344425 A1* | 11/2014 | Varney | H04L 41/509 | 709/221 |
| 2014/0344452 A1* | 11/2014 | Lipstone | H04L 65/612 | 709/224 |
| 2014/0344453 A1* | 11/2014 | Varney | H04L 65/612 | 709/224 |
| 2015/0066675 A1* | 3/2015 | Camelio | G06Q 50/01 | 705/26.1 |
| 2016/0019610 A1* | 1/2016 | Willis, Jr. | G06Q 30/0625 | 705/26.62 |
| 2016/0019622 A1* | 1/2016 | Willis, Jr. | G06Q 30/0625 | 705/26.62 |
| 2016/0217416 A1* | 7/2016 | Searls | G06Q 10/087 | |
| 2017/0178371 A1* | 6/2017 | Gonzales, Jr. | G06V 10/56 | |
| 2017/0262883 A1* | 9/2017 | Vir | G06Q 30/0251 | |
| 2019/0034464 A1* | 1/2019 | Nozhchev | G06F 16/2455 | |
| 2019/0080207 A1* | 3/2019 | Chang | G06F 16/906 | |
| 2019/0258984 A1* | 8/2019 | Rehman | G06N 3/047 | |
| 2020/0082307 A1* | 3/2020 | Haze | G06N 5/022 | |
| 2020/0089764 A1* | 3/2020 | Ritter | G06V 40/172 | |

\* cited by examiner

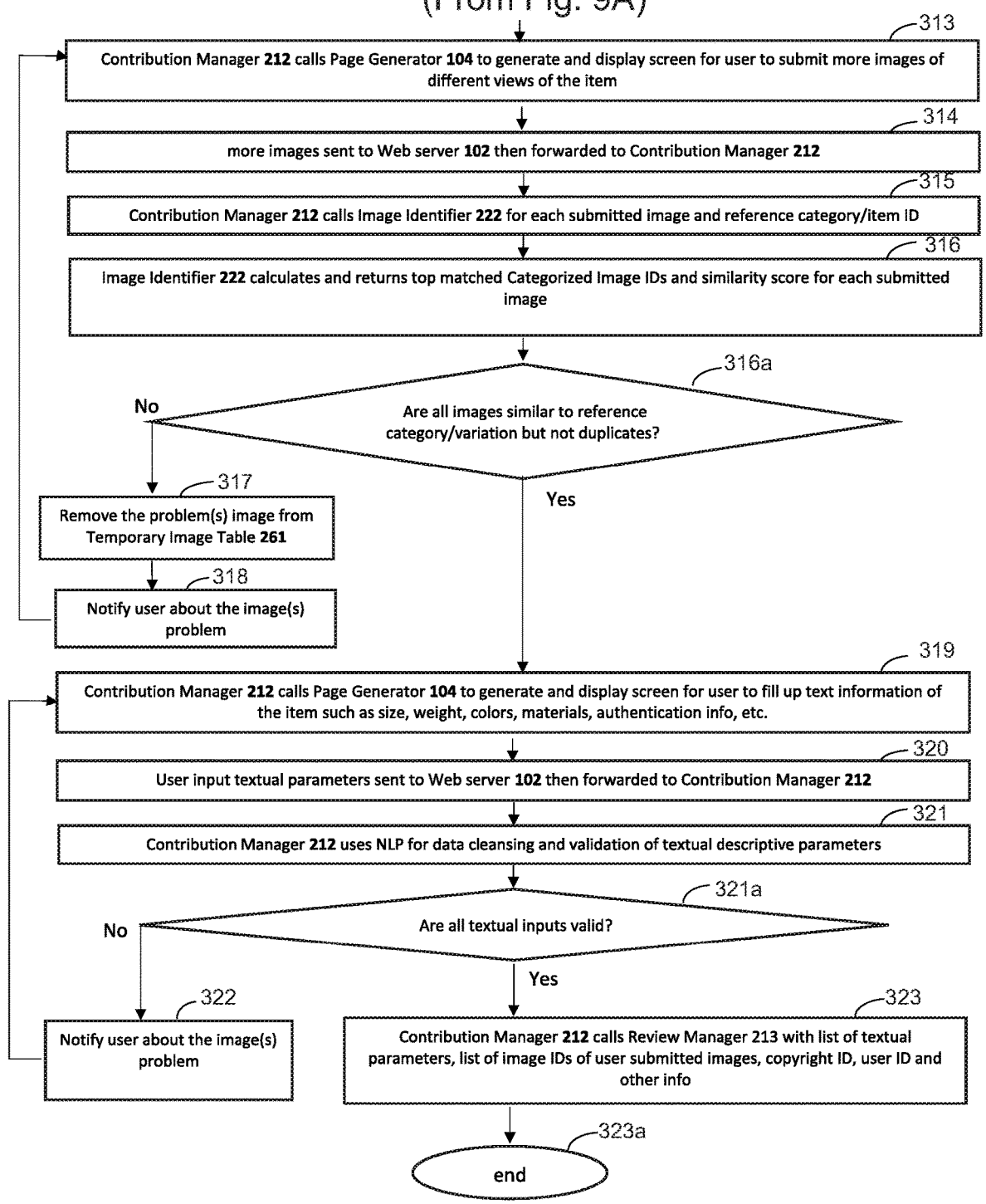

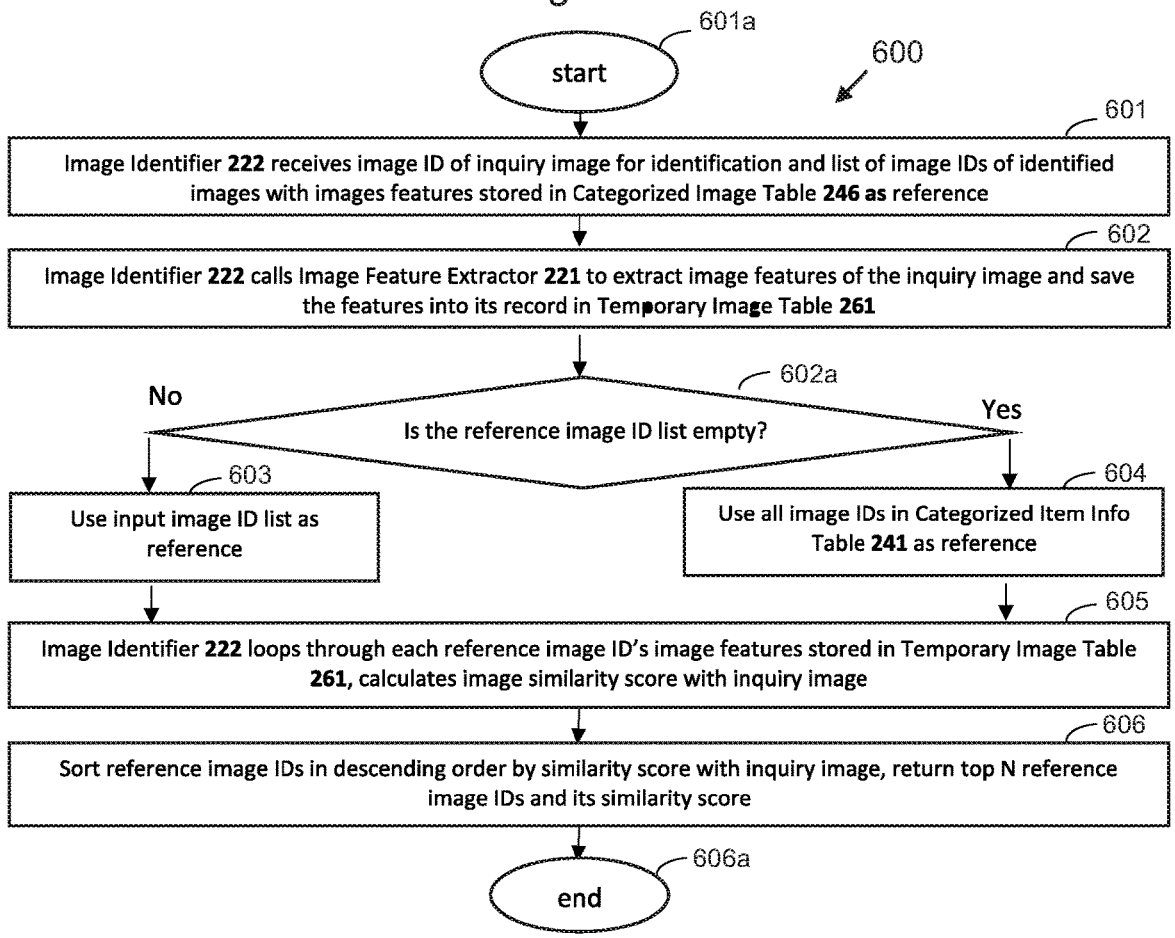
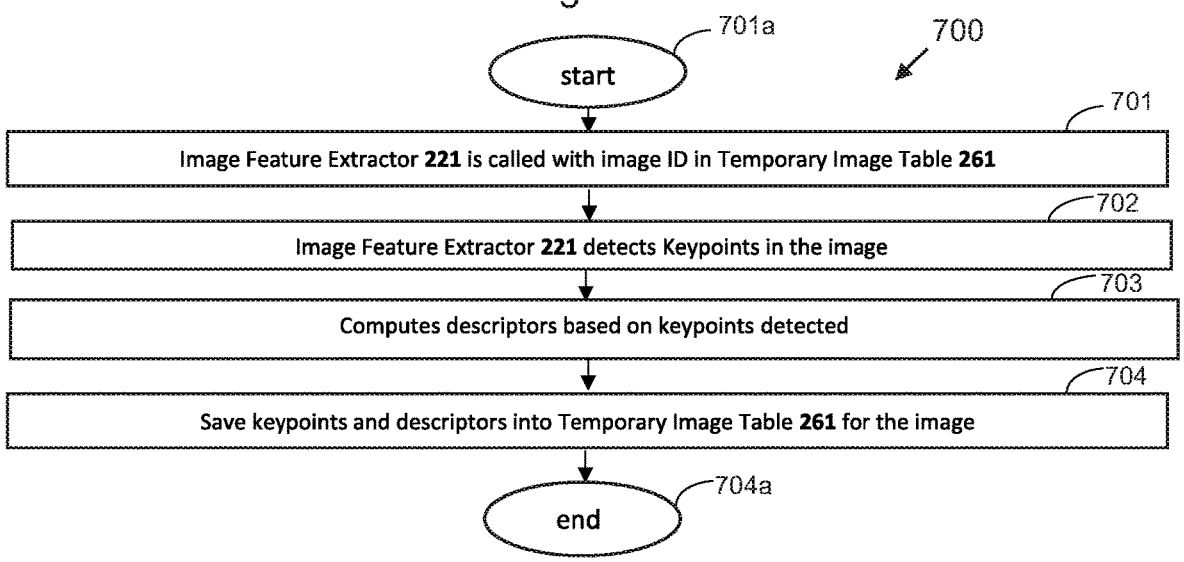

Fig. 16

Example of Item Info Table 241

```
Item ID: ....
    Name: Raspberry Schreiner Hexagon Ruffle Pin
    Alternative labels:
        Purple ruffle
    Background Info:
        Start Year: 1965
        End Year: 1973
        Designer:
            Ambros Albert
            Terry Schreiner
        Note: a variation of the legendary Schreiner Ruffle Pin, more complicated design...
    Note: ....
    Brand ID: ....
    Manufacturer ID: ....
    Category ID: ...
    Textual Descriptive Parameters:
        Weight: 25 grams
        Size: 2 ½" x 1" x 1 ½"
        Colors:
            Main: Raspberry
            Supplementary: Pink, Purple, Green
        Materials:
            Main: Keystones
            Supplementary: Steel
        Shape: hexagonal, round circle center
        Construction: hook and eye, ruffle, uneven, radiational, ....
        Deco: clustered flower
        Technology:
            prong set
            hook and eye construction
        Other: 6 groups of keystones, each group has 3 keystones connected by wire...
    Categorized Image List:
        Image ID: ....
        Image ID: ...
        Image ID: ...
        ....
....
```

Fig. 17

Example of Manufacturer Table 242

```
....
Manufacturer ID: xxxx
    Name: Schreiner New York
    Alternative labels:
        Schreiner NYC
        Schreiner
    Established year: 1940
    Business closed year: 1973
    Headquarter Location: New York, NY
    Founder: Henry Schreiner
    Background: ....
    Industry:
        Jewelry
        Accessory
    Product Categories:
        Category ID:
            Item ID
            Item ID
            ...
        Category ID:
        ....
    Well known labels:
        ruffle
    ....
Manufacturer ID: xxxx
    Name: CORO Jewelry, Cohn & Rosenberger
    Alternative labels:
        CORO
        Coro Craft
    Established year: 1901
    Business closed year: 1979
    Headquarter Location: Providence, RI
    Founder:
        Emanuel Cohn
        Carl Rosenberger
    Background: ....
    Industry:
        Jewelry
        Accessory
    Product Categories:
        Category ID:
            Item ID
            Item ID
....
```

Fig. 18

Example of Brand Table 243

```
.....
Brand ID: xxxx
        Manufacturer ID: xxxxx
        Brand Name: Corocraft Sterling
        Years: 1919 – 1973
        Industry:
                Jewelry
                Accessory
        Product Categories:
                Category ID:
                        Item ID
                        Item ID
                        ...
                Category ID:
                ....
        Well known labels:
                Duette
                ...
....
```

Fig. 19

Example of Category Info Table 244

Category ID: xxxx
    Name: Book
    …
….
Category ID: xxxx
    Name: Furniture
    …
……
Category ID: xxxx
    Name: Jewelry
    Description: xxxx
    Alternative labels: jewel
    Sub-categories:
        Category ID: xxxx
           Name: Bracelet
           Description: ….
           Alternative labels: …
           Sub-categories:
                Category ID: xxxx
                    Name: Bangle
                    Description: …
                …
                Category ID: xxxx
                    Name: Cuff
                    Description: …
            ….
        Category ID: xxxxx
           Name: Earrings
           …
        Category ID: xxxxx
           Name: Brooch
        ….
Category ID: xxxx
    Name: Coin
    ….
….

Fig. 20
Example of Expert Info Data 251

```
Expert ID: ...
    Full Name: ...
    Company Name: ...
    Contact:
        Mailing Address: ...
        Billing Address: ...
        Email:
        Phone:
    Authority Score by Categories:
        Category ID: xxx
            Authority Score: 4.0
        Category ID: xxx
            Authority Score:4.0
        Category ID: xxx
            Item ID: ....
                Authority Score: 3.0
            Item ID: ....
                Authority Score: 5.0
        ....
    Assignments:
        Assignment ID: ....
            Job Status: finished
            Assigned time: ...
            Accepted time: ...
            Expected Finish Time: ....
            Finish time: ....
            Quality score:  4.5
            Completeness score: 100%
            On time score: 5.0
        Assignment ID: ...
            Job Status: under working
            Assigned time: ...
            Accepted time: ...
            Expected Finish Time: ....
            Current Quality score: 5.0
            Current Completeness Ratio:  20%
            Projected Ontime Ratio:  100%
        .....
```

Fig. 21

Example of User Info Data 231

```
User ID: xxxx
    Login: ...
    Password: ....
    Full Name (required for contributor):
    Contact:
        Email:
        Mailing Address (required for contributor):
        Phone (required for contributor):
    Signup Time: yyyy-mm-dd hh-mm-ss
    Image Search requests:
        Request ID: ...
            Request Temporary Image ID: ...
            Result:
                Conclusion: top match found
                Top matches:
                    Item ID: ...
                        Categorized Image ID: ...
                        Similarity score:
                        Categorized Image ID: ...
                        Similarity score:
                    Item ID: ...
                    ....
            Submitted time: yyyy-mm-dd hh-mm-ss
            Finished time: yyyy-mm-dd hh-mm-ss
        Request ID: ....
            Request Temporary Image ID: ...
            Result:
                Conclusion: No match found
            Submitted time: yyyy-mm-dd hh-mm-ss
            Finished time: yyyy-mm-dd hh-mm-ss
        ....
    Contributions:
        Review ID: ....
            Status: under review
            Submitted time: yyyy-mm-dd hh-mm-ss
        Review ID: ....
            Status: approved new item
            Submitted Time: yyyy-mm-dd hh-mm-ss
            Finished Time: yyyy-mm-dd hh-mm-ss
        Review ID: ....
            Status: pre-validation failed
            Submitted time: yyyy-mm-dd hh-mm-ss
            Finished time: yyyy-mm-dd hh-mm-ss

Example of Review Record 252

```
Review ID: ....
    Contributor user ID: ...
    Submitted Time: yyyy-mm-dd hh-mm-ss
    Copyright ID: ....
    Submitted Item Info:
        background info: ....
        category ID: ....
        brand ID: ...
        item ID: ...
        Suggested contribution type: new design
        Physical info:
            Weight: 25 grams
            Size: 2 ½" x 1" x 1 ½"
            Colors: see variation
            Materials:
                Main: Keystones
                Supplementary: Steel
            Shape: hexagonal, round circle center
            ....
        Colors:
            Main: red
            Supplementary: pink, yellow, ...
        Keywords: Rhinestone, gold-plated, ...
        Authentication info:
            note:  My grandma bought this pin with receipt showing the date to be 1969 ... and I also found it in this book "...."
            proof info:
                Temporary image ID: ...
                    note: original receipt
                Temporary image ID: ...
                    note: page on book "...." With this pin
        Temporary Image ID List:
            Image ID: ...
            Image ID: ....
            ....
    Review result:
        Conclusion: new item
        Assigned new ID:  jewelry_bracelet_schreiner_2235_05
    Review records:
        Assignment ID: ....
            Expert ID: ....
            Conclusion: New item
            Expert note: some information is insufficient
            Detailed Review results:
                Physical parameters:
                    Weight:  missing
        Assignment ID: ...
            Expert ID: ....
            Conclusion: New item
            ....
......
```

Fig. 23
Example of Categorized Image Table 246

```
....
Image ID: ...
        Item ID: ...
        Image location:   s3://....
        Added Time:   yyyy-mm-dd hh-mm-ss
        Usage: item identification
        Copyright ID: ....
        Image Basic Info:
                size:
                format:
                ...
        Other info:
                View: front
                ....
        Computer Vision Features:
                Keypoint list:
                        Key point:
                                Coordinates: (x,y)
                                Size of meaningful neighborhood: ....
                                Orientation: ....
                                ....
                        Key point:
                                Coordinates: (x,y)
                                Size of meaningful neighborhood: ....
                                Orientation: ....
                                ....
                Descriptor list:
                        Descriptor:
                                data: ....
                        Descriptor:
                                data: ....
                        ...
Image ID: ...
        Item ID: ...
        Image location:   s3://....
        Added Time:   yyyy-mm-dd hh-mm-ss
        Usage: support info of item
        Copyright ID: ....
        Image Basic Info:
                size:
                format:
                ...
        Other info:
                Note: purchase receipt
                ....
Image ID: ...
        Item ID: ...
....
```

Fig. 24

Example of Temporary Image Table 261

....
Image ID: xxxxx
    Image location: s3://....
    Added Time: yyyy-mm-dd hh-mm-ss
    Usage: contributed item image
    Copyright ID:
    Basic info:
        size:
        format:
        ...
    Other info:
        View: front
        ...
    Computer Vision Features(optional):
        Keypoint list:
            Key point:
                Coordinates: (x,y)
                Size of meaningful neighborhood:....
                Orientation: ....
                ....
            Key point:
                Coordinates: (x,y)
                Size of meaningful neighborhood:....
                Orientation: ....
                ....
        Descriptor list:
            Descriptor:
                data:....
            Descriptor:
                data:....
        ...

Item ID: xxxxx

Example of Copyright Record Table 245

```
....
copyright ID: xxxxx
        Signoff Time:
        Preferred Copyright label:
        Signed document: s3://......
        Contributor User ID:
        Covered Images:
                Image ID: ....
                Image ID: ....
                ....
copyright ID: xxxxx
.....
```

METHOD, APPARATUS, AND SYSTEM FOR DATA COLLECTION, TRANSFORMATION AND EXTRACTION TO SUPPORT IMAGE AND TEXT SEARCH OF ANTIQUES AND COLLECTABLES

FIELD OF THE INVENTION

This invention relates to computer vision and natural language processing, and processing information concerning antiques and collectables.

BACKGROUND OF THE INVENTION

In the antiques/collectables industry, a major hindrance to the industry's development is available information. Compared to the diversities and scope of the real world of antiques and collectables, related information is very limited and fragmented. Methods used for Information collection are outdated and unsystematic compared to the rapid change in the industry. Most people still use books and scattered information online as their main source of information, and even in these sources, said problems also exist. Quite often, information from different sources contradict each other; meanwhile, thousands of items are being passed from hand to hand every day, where emerging collectables and rare items are often unacknowledged.

Another problem in the industry is that there is only one search method currently available—text search. In antiques and collectables, using the right terminology is a skill that requires years of formal training and experience. And most of the time in antiques and collectables related text search, using the right terms determines if information of similar pieces can be found. The situation that users often encounter is, with an item in hand, he or she cannot find its identity and value. Meanwhile, available image searches provided by generic search engines are mostly color based, with images ranked by page ranking score and website popularity without considering the context of antiques/collectables. The outline of items in the image are not the main factors during match. This makes the matching method unsuitable for antiques/collectables identification where consistency in shape and outline between two items is the first and most important prerequisite. Many images of rare items, mostly historical images in greyscale, are seldom found and never used in identification.

Besides technologies, there are other key issues that must be resolved. The first critical issue is copyright—the limitation of most of sources of information in antiques and collectables today comes from copyright restriction. Each collector/dealer can only collect so many pieces and sets during their lifetime, and their collections usually reflect certain interests, focusing only on certain categories and/or brands. To include more items, a book publisher and a web master must negotiate copyright permission with each item owner. This process can be very time consuming and caused uncertainty. As a result, each book or web site usually only includes collections from a few collectors and thus becomes very limited. To build a more complete knowledge base without copyright limitations, an automated copyright granting and documentation process is necessary.

Another issue that determines the success or failure of a knowledge base data is the authority and accuracy of information. Ideally, for an item to be admitted to a knowledge base, having multiple experts to review, edit and verify each other's work would ensure the quality of output. But most experts in the antiques and collectables industry only focus on certain fields, and the number of experts who can work on each field is limited. To cover as many fields in antiques and collectables as possible, a large number of experts is required.

SUMMARY OF THE INVENTION

In one or more embodiments of the present invention a method is provided comprising the steps of: generating a knowledge base in a database, by use of one or more computer processors, the knowledge base comprised of a plurality of fields, wherein a first field of the plurality of fields of the knowledge base specifies a plurality of known brands of a plurality of known objects, wherein a second field of the plurality of fields specifies a plurality of known categories corresponding to the plurality of known objects, wherein a third field of the plurality of fields specifies a plurality of sets of known image-based parameters of the plurality of known objects; receiving in one or more computer memories an indication of a brand, an indication of a category, and an image-based description parameter for a particular object; comparing, by use of one or more computer processors, the indications of the brand, the category, and the image-based description parameter for the particular object with one or more of the plurality of known brands, one or more of the plurality of known categories, and one or more of the plurality of sets of known image based parameters, respectively, providing in one or more computer memories an indication of whether the particular object is one or more of the plurality of known objects, based, at least in part, on a combination of the comparison of the indication of the brand of the particular object with one or more of the plurality of known brands, the comparison of the indication of the category of the particular object with one or more of the plurality of known categories, and the comparison of the image-based description parameter of the particular object with one or more of the plurality of sets of known image based parameters, respectively.

A fourth field of the plurality of fields may specify a plurality of sets of known text based description parameters of the plurality of known objects; and the method may further be comprised of receiving in one or more computer memories a text based description parameter for the particular object; and comparing, by use of one or more computer processors, the text based description parameter of the particular object with one or more of the plurality of sets of known text based description parameters; and wherein the step of providing in one or more computer memories an indication of whether the particular object is one or more of the plurality of known objects, is based, at least in part, on the comparison of the text based description parameter of the particular object with one or more of the plurality of sets of known text based description parameters The indication of whether the particular object is one or more of the plurality of known objects, may be a plurality of scores corresponding to more than one of the plurality of known objects. The step of generating the knowledge base in the database may include receiving a plurality of third party inputs via one or more computer processors, having one or more experts in one or more fields related to the third party inputs, analyze the plurality of third party inputs through the internet and through one or more computer processors, and if the one or more experts determine that the third party inputs are acceptable, storing the plurality of third party inputs for one or more of the plurality of known brands, one or more the plurality of known categories, and one or more of the plurality of sets of known image-based parameters of the plurality of known objects in the database, and if the one or more experts determine that the third party inputs are not acceptable, not storing the plurality of third party inputs in the database.

The step of generating the knowledge base in the database may include receiving a plurality of third party inputs via one or more computer processors, and using the one or more computer processors to analyze the third party inputs to determine if they satisfy predetermined pre-validation criteria for one or more of the plurality known brands, one or more of the plurality of known categories, and one or more of the plurality of known image-based parameters.

In at least one embodiment, if one or more of the third party inputs satisfy predetermined pre-validation criteria having one or more experts in one or more fields related to the third party inputs, analyze the plurality of third party inputs through the internet and through one or more computer processors, and if the one or more experts determine that the third party inputs are acceptable, storing the plurality of third party inputs for one or more of the plurality of known brands, one or more the plurality of known categories, and one or more of the plurality of sets of known image-based parameters of the plurality of known objects in the database, and if the one or more experts determine that the third party inputs are not acceptable, not storing the plurality of third party inputs in the database.

The method may further include using one or more computer processors to transfer one or more copyrights of one or more images corresponding to the plurality of sets of known image-based parameters.

In at least one embodiment, an apparatus and/or system is provided which may include the one or more computer processors; and the one or more computer memories; wherein the one or more computer processors are programmed by computer software stored in the one or more computer memories to execute one or more of the steps previously specified.

One or more embodiments of the present invention use both Computer Vision and NLP (natural language processing) technologies to resolve issues referred to previously and to transform antiques and collectables information into a complete, cohesive, hierarchical data structure with description parameters supporting both text search and image search. Generally, information can be collected or acquired from a third party in bulk mode or submitted by an individual user. In one or more embodiments of the present invention, searchable textual and image features are extracted and/or generated to enable text and image search, and searchable textual and image features are combined to improve result relevancy.

BRIEF DESCRIPTION OF THE DRAWINGS

FIG. 9B shows a flow chart of a second part of the user contribution process continued from FIG. 9A;

FIG. 12 shows a flow chart of a control flow of image identification process, which is typically executed by one or more computer processors, in accordance with computer software stored in one or more computer memories, in accordance with an embodiment of the present invention;

FIG. 13 shows a flow chart of a control flow of image feature extraction process, which is typically executed by one or more computer processors, in accordance with computer software stored in one or more computer memories, in accordance with an embodiment of the present invention;

FIG. 16 shows an example of an item info table, in accordance with an embodiment of the present invention, which may be stored in one or more computer memories and/or disks by one or more computer processors;

FIG. 17 shows an example of a manufacturer table, in accordance with an embodiment of the present invention, which may be stored in one or more computer memories and/or disks by one or more computer processors;

FIG. 18 shows an example of a brand table, in accordance with an embodiment of the present invention, which may be stored in one or more computer memories and/or disks by one or more computer processors;

FIG. 19 shows an example of a category info table, in accordance with an embodiment of the present invention, which may be stored in one or more computer memories and/or disks by one or more computer processors;

FIG. 20 shows an example of an expert info table, in accordance with an embodiment of the present invention, which may be stored in one or more computer memories and/or disks by one or more computer processors;

FIG. 21 shows an example of a user info table, in accordance with an embodiment of the present invention, which may be stored in one or more computer memories and/or disks by one or more computer processors;

FIG. 22 shows an example of a review record table, in accordance with an embodiment of the present invention, which may be stored in one or more computer memories and/or disks by one or more computer processors;

FIG. 23 shows an example of a categorized image table, in accordance with an embodiment of the present invention, which may be stored in one or more computer memories and/or disks by one or more computer processors;

FIG. 24 shows an example of a temporary image table, in accordance with an embodiment of the present invention, which may be stored in one or more computer memories and/or disks by one or more computer processors;

FIG. 25 shows an example of a copyright record table, in accordance with an embodiment of the present invention, which may be stored in one or more computer memories and/or disks by one or more computer processors;

DETAILED DESCRIPTION OF THE DRAWINGS

Figure 1:
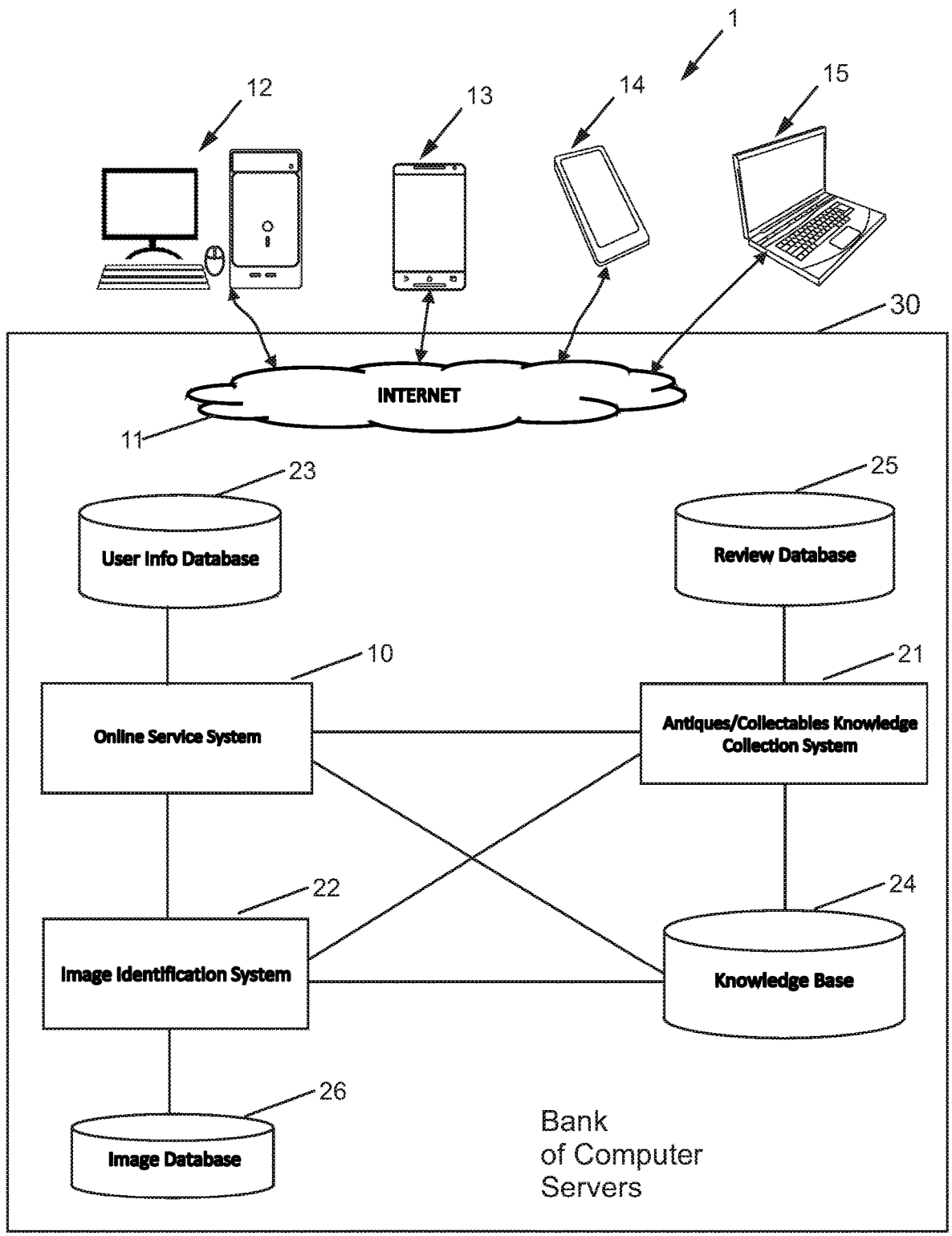
FIG. 1 shows a simplified block diagram of an apparatus, method, and system in accordance with an embodiment of the present invention.

FIG. 1 shows a simplified block diagram of an apparatus, method, and system 1 in accordance with an embodiment of the present invention, which includes systems, apparatus and methods 10, 21, and 22, databases 23, 24, 25, and 26, devices 12-15, and bank of computer servers 30.

Figure 2:
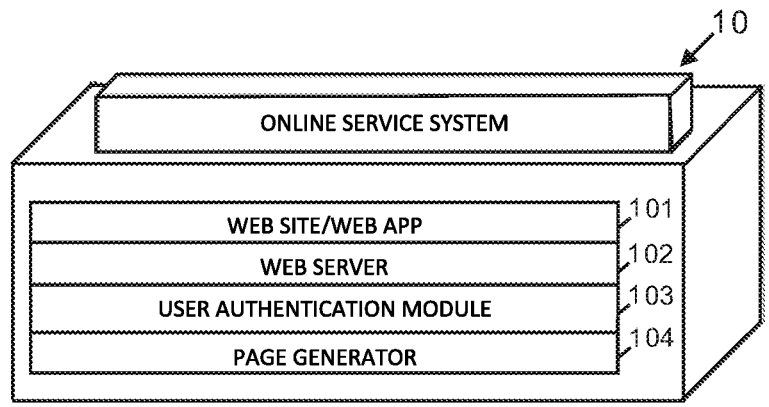
FIG. 2 shows a simplified block diagram of an online service apparatus, method, and system for use with the embodiment of FIG. 1.

FIG. 2 shows a simplified block diagram of an online service apparatus, method, and system 10 for use with the embodiment of FIG. 1. The system 10 includes software modules 101, 102, 103, and 104, which is typically executed by one or more computer processors, in accordance with computer software stored in one or more computer memories, in accordance with an embodiment of the present invention, such as computer memories of bank of computer servers or processors 30.

Figure 3:
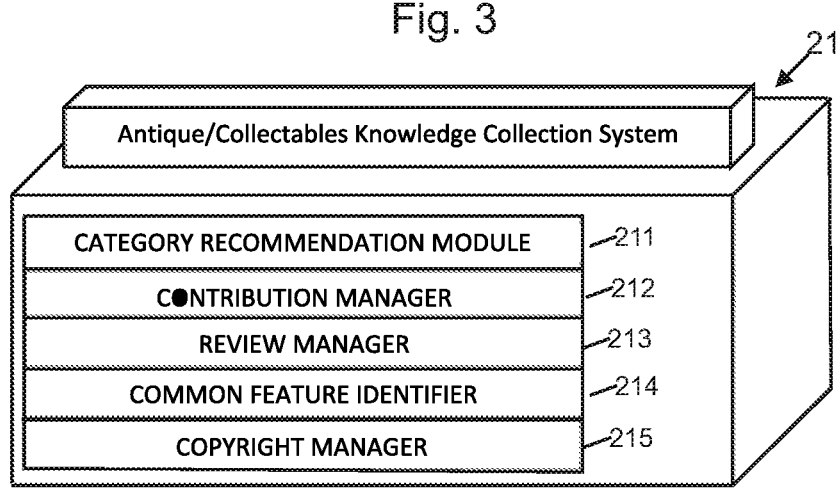
FIG. 3 shows a simplified block diagram of an antique/collectables knowledge collection apparatus, method, and system for use with the embodiment of FIG. 1.

FIG. 3 shows a simplified block diagram of an antique/collectables knowledge collection apparatus, method, and system 21 for use with the embodiment of FIG. 1. The system 21 includes software modules 211, 212, 213, 214, and 215, which is typically executed by one or more computer processors, in accordance with computer software stored in one or more computer memories, in accordance with an embodiment of the present invention, such as computer memories of bank of computer servers or processors 30.

Figure 4:
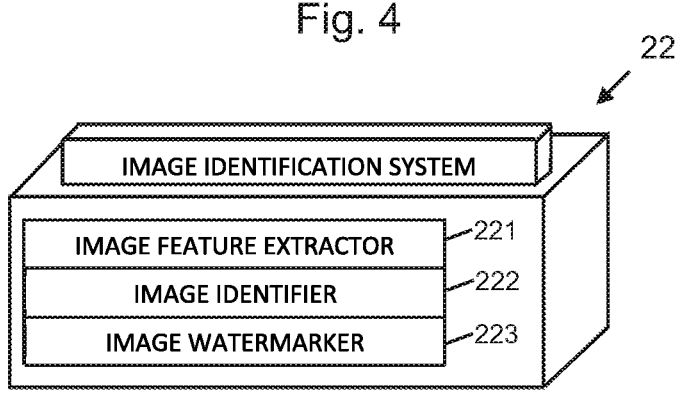
FIG. 4 shows a simplified block diagram of an image identification apparatus, method, and system for use with the embodiment of FIG. 1.

FIG. 4 shows a simplified block diagram of an image identification apparatus, method, and system 22 for use with the embodiment of FIG. 1. The system 22 includes software modules 221, 222, and 223, which is typically executed by one or more computer processors, in accordance with computer software stored in one or more computer memories, in accordance with an embodiment of the present invention, such as computer memories of bank of computer servers or processors 30 shown in FIG. 1.

Figure 5:
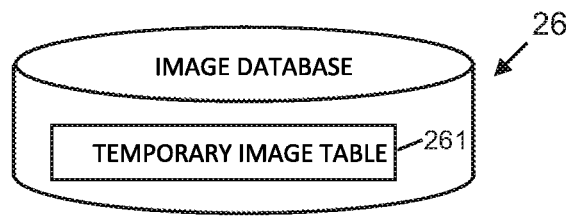
FIG. 5 shows a simplified block diagram of an image database for use with the embodiment of FIG. 1.

FIG. 5 shows a simplified block diagram of an image database 26 for use with the embodiment of FIG. 1, wherein the image database 26 includes a temporary image table 261, stored therein.

Figure 6:
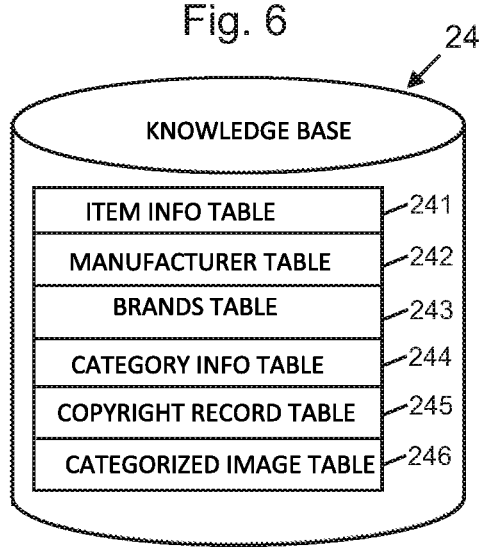
FIG. 6 shows a simplified block diagram of a knowledge base database or knowledge base, wherein "knowledge base" and "knowledge base database" are interchangeable in this present application, for use with the embodiment of FIG. 1.

FIG. 6 shows a simplified block diagram of a knowledge base or database 24, for use with the embodiment of FIG. 1, wherein the knowledge base 23 includes an item info table 241, a manufacturer table 242, a brands table 243, a category info table 244, a copyright record table 245, and a categorized image table 246, stored therein.

Figure 7:
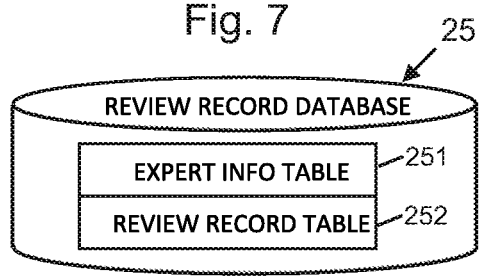
FIG. 7 shows a review record database for use with the embodiment of FIG. 1.

FIG. 7 shows a review record database 25 for use with the embodiment of FIG. 1; wherein the review record database 25 includes an expert info table 251, and a review record table 252, stored therein.

Figure 8:
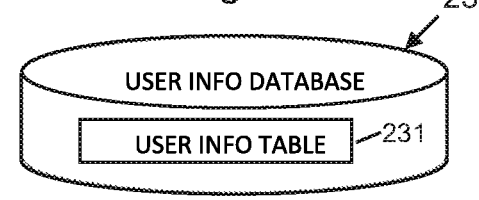
FIG. 8 shows a user info database for use with the embodiment of FIG. 1.

FIG. 8 shows a user info database 23 for use with the embodiment of FIG. 1; wherein the user info database 23 includes a user info table 231, stored therein.

Figure 9A:
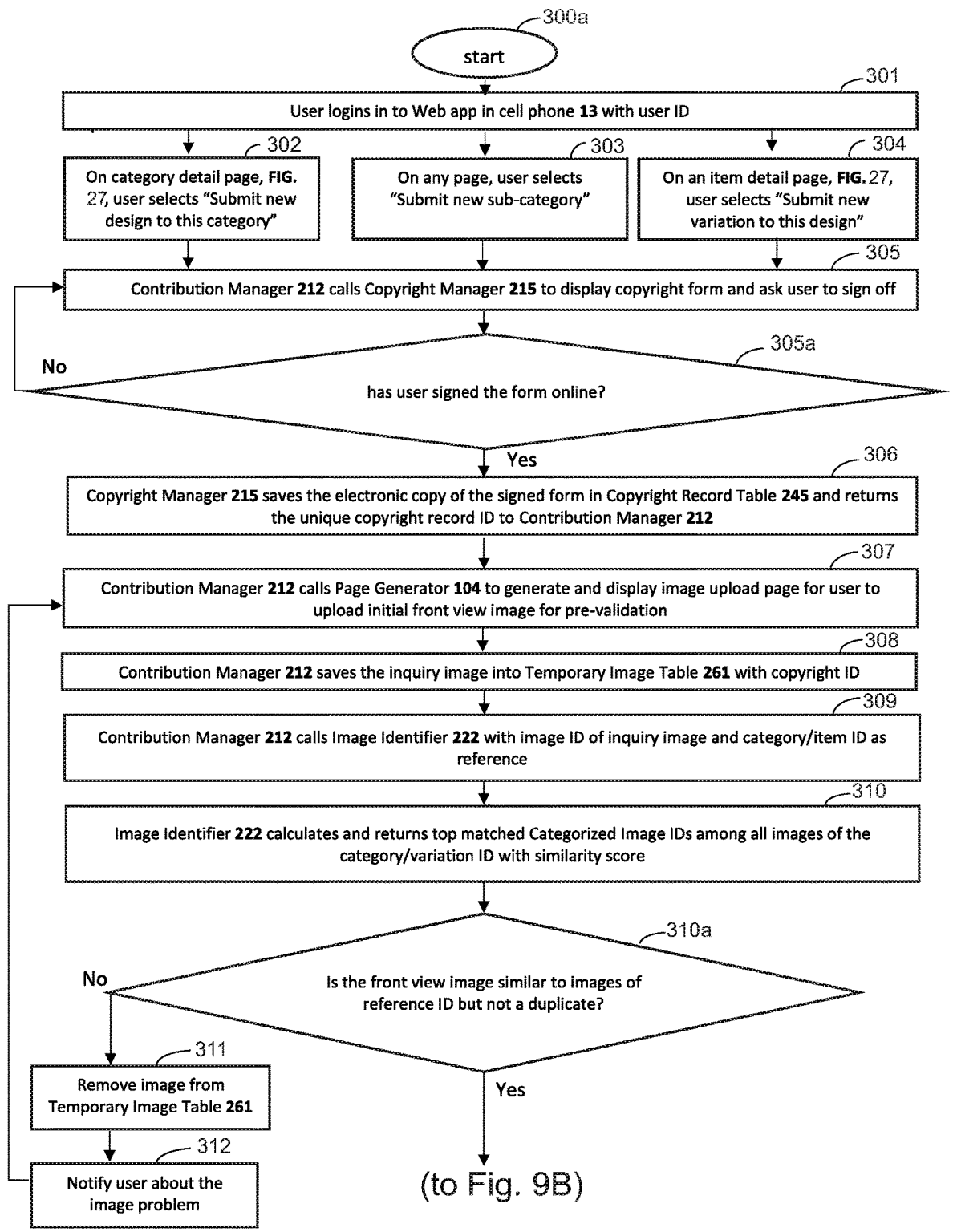
FIG. 9A shows a flow chart of a first part of a user contribution process, which is typically executed by one or more computer processors, in accordance with computer software stored in one or more computer memories, in accordance with an embodiment of the present invention.

FIG. 9A shows a flow chart of a first part of a user contribution process, which is typically executed by one or more computer processors, in accordance with computer software stored in one or more computer memories, in accordance with an embodiment of the present invention, such as computer memories of bank of computer servers or processors 30. FIG. 9B shows a flow chart of a second part of the user contribution process continued from FIG. 9A. The combination of FIGS. 9A-9B includes steps 300a, 301-305, 305a, 306-310, 310a, 311-316, 316a, 317-321, 321a, 322, 323, and 323a.

Figure 10A:
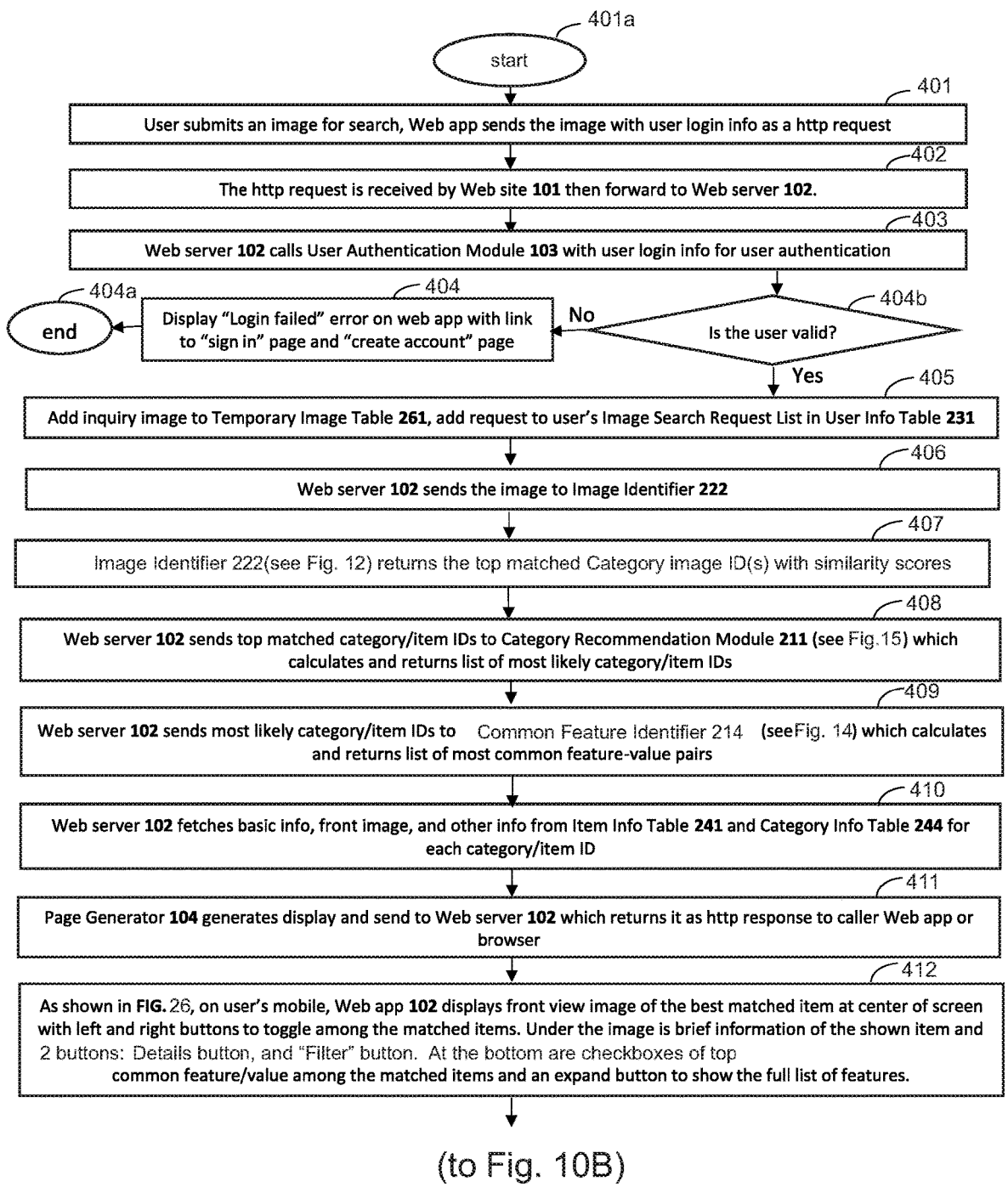
FIG. 10A shows a flow chart of a first part of a control flow of item identification request process, which is typically executed by one or more computer processors, in accordance with computer software stored in one or more computer memories, in accordance with an embodiment of the present invention.
Figure 10B:
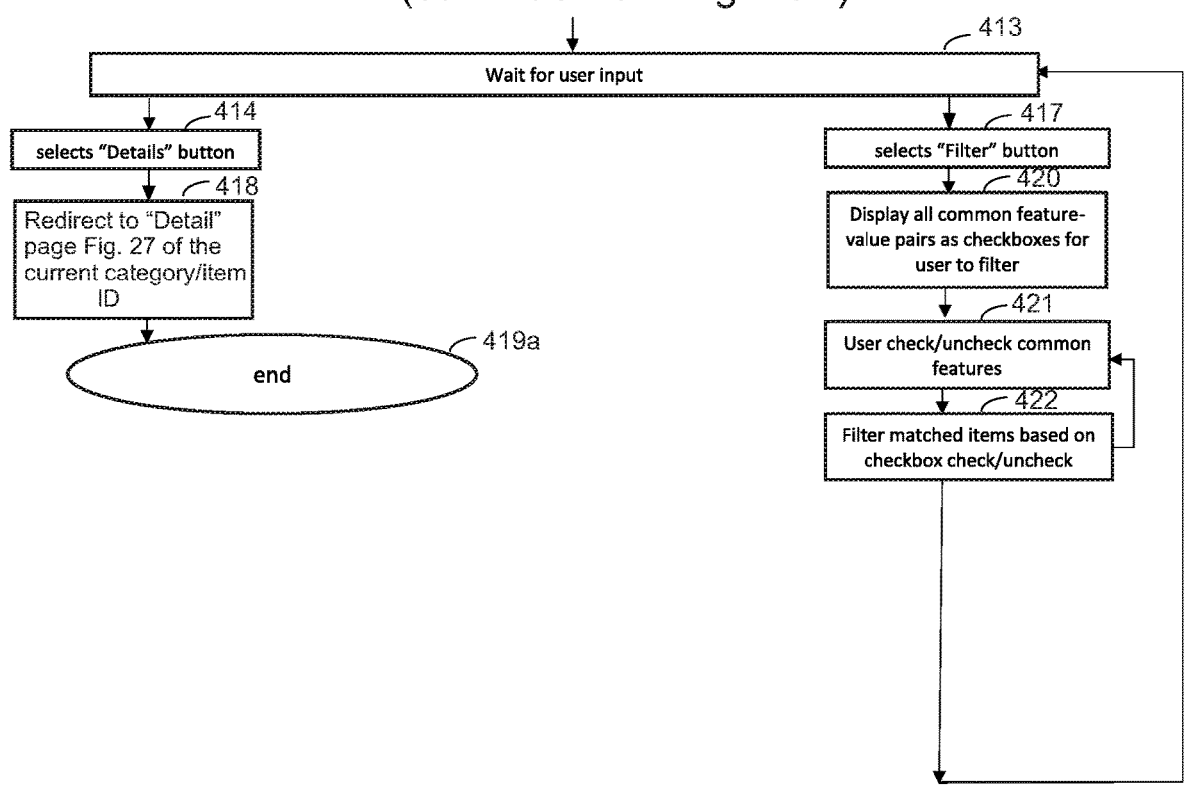
FIG. 10B shows a flow chart of a second part of the control flow of item identification request process, continued from FIG. 10A.

FIG. 10A shows a flow chart of a first part of a control flow of item identification request process, which is typically executed by one or more computer processors, in accordance with computer software stored in one or more computer memories, in accordance with an embodiment of the present invention, such as computer memories of bank of computer servers or processors 30, in accordance with an embodiment of the present invention. FIG. 10B shows a flow chart of a second part of the control flow of item identification request process, continued from FIG. 10A. The combination of FIGS. 10A-10B includes steps 401a, 401-404, 404a, 404b, 405-414, 417,418, 419a, and 420-422.

Figure 11A:
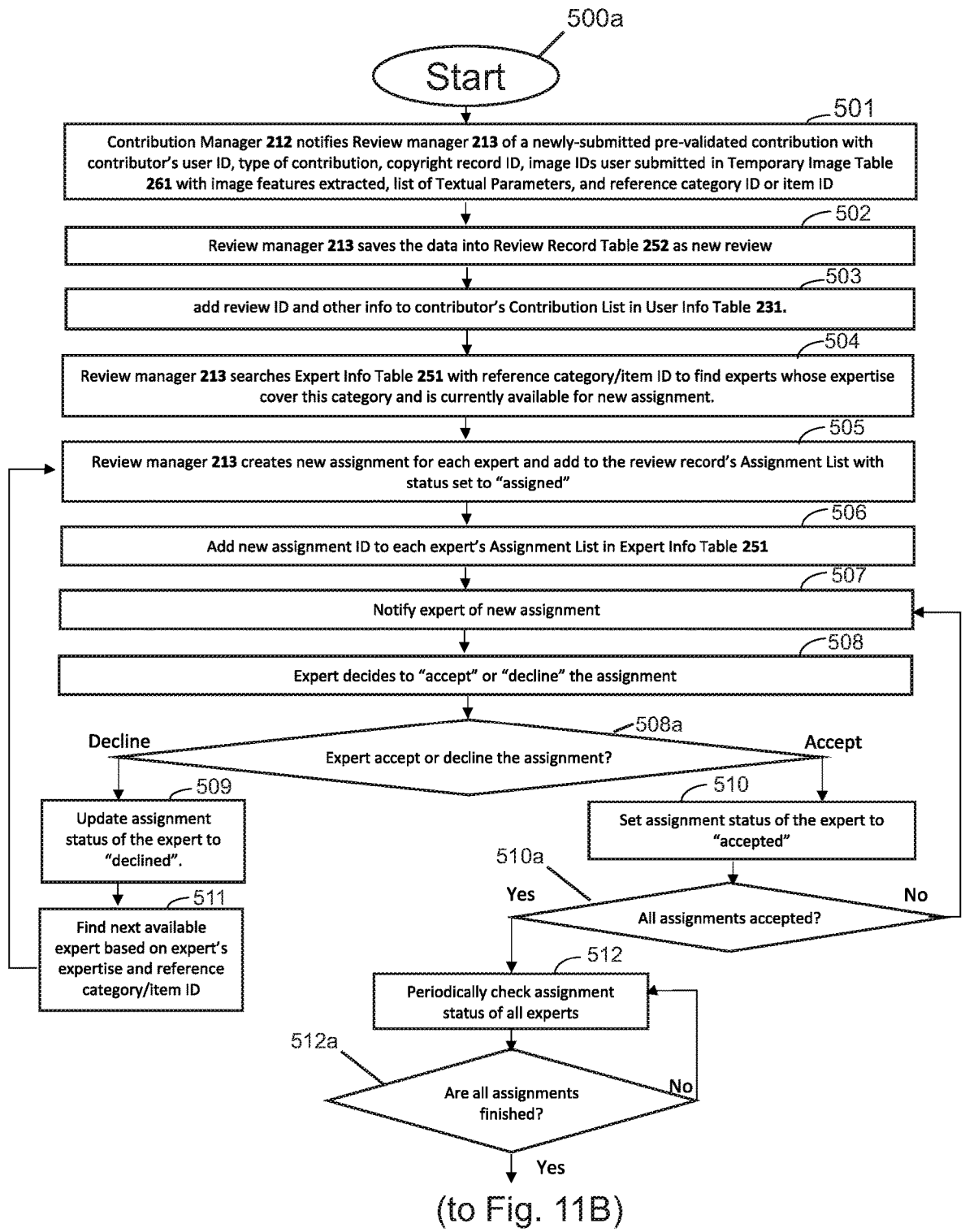
FIG. 11A shows a flow chart of a first part of a contribution review process which is typically executed by one or more computer processors, in accordance with computer software stored in one or more computer memories, in accordance with an embodiment of the present invention.
Figure 11B:
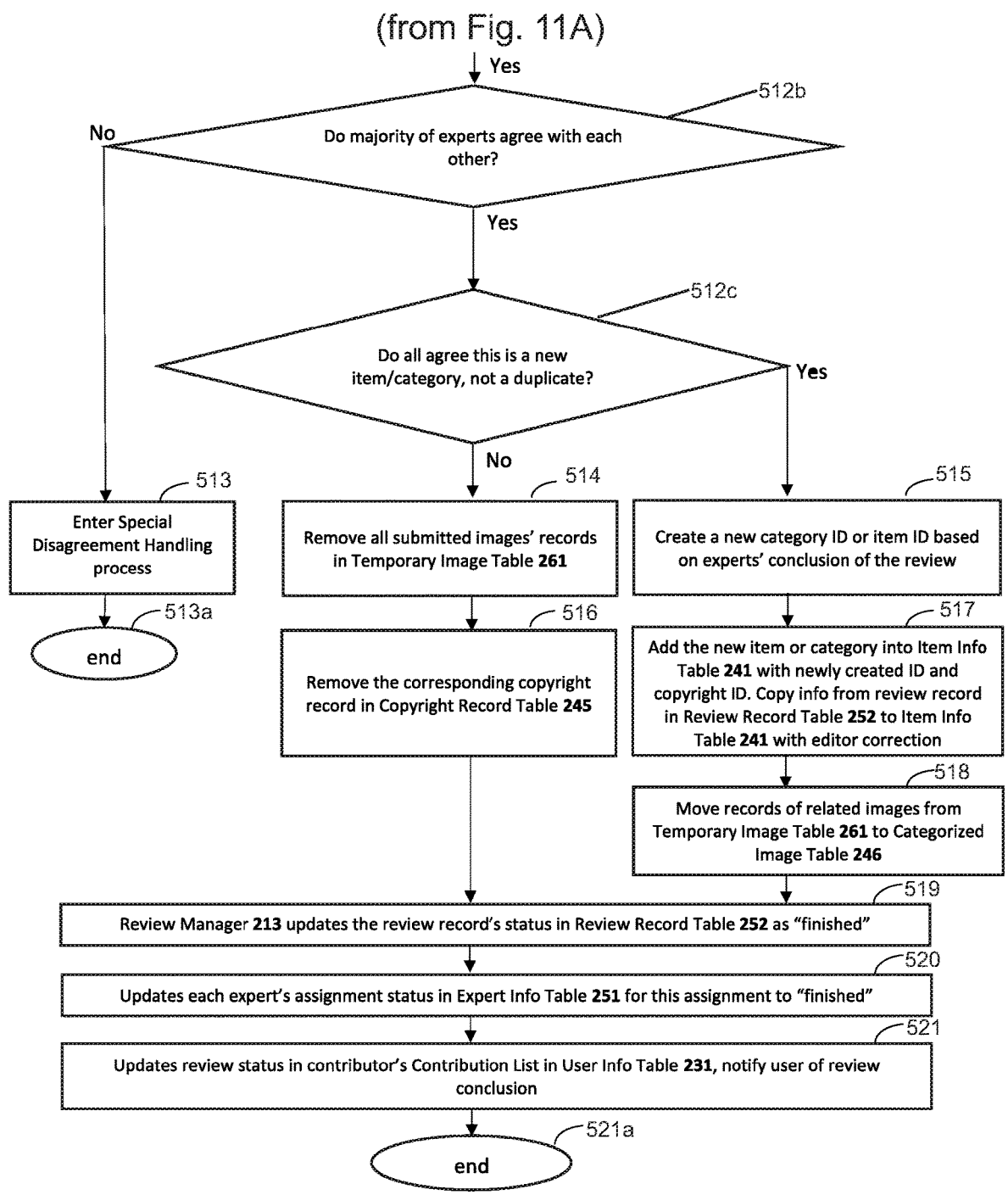
FIG. 11B shows a flow chart of a second part of the contribution review process continued from FIG. 11A.

FIG. 11A shows a flow chart of a first part of a contribution review process which is typically executed by one or more computer processors, in accordance with computer software stored in one or more computer memories, in accordance with an embodiment of the present invention, such as computer memories of bank of computer servers or processors 30, in accordance with an embodiment of the present invention. FIG. 11B shows a flow chart of a second part of the contribution review process continued from FIG. 11A. The combination of FIGS. 11A-11B includes steps 500a, 501-508, 508a, 509-511, 510a, 512, and 512a, 512b, 512c, 513-521, 513a, and 521a.

FIG. 12 shows a flow chart 600 of a control flow of image identification process, which is typically executed by one or more computer processors, in accordance with computer software stored in one or more computer memories, in accordance with an embodiment of the present invention, such as computer memories of bank of computer servers or processors 30, in accordance with an embodiment of the present invention. The flow chart 600 includes steps 601a, 601-602, 602a, 603-606, and 606a.

FIG. 13 shows a flow chart 700 of a control flow of image feature extraction process, which is typically executed by one or more computer processors, in accordance with computer software stored in one or more computer memories, in accordance with an embodiment of the present invention, such as computer memories of bank of computer servers or processors 30, in accordance with an embodiment of the present invention. The flow chart 700 includes steps 701a, 701-704, and 704a.

Figure 14:
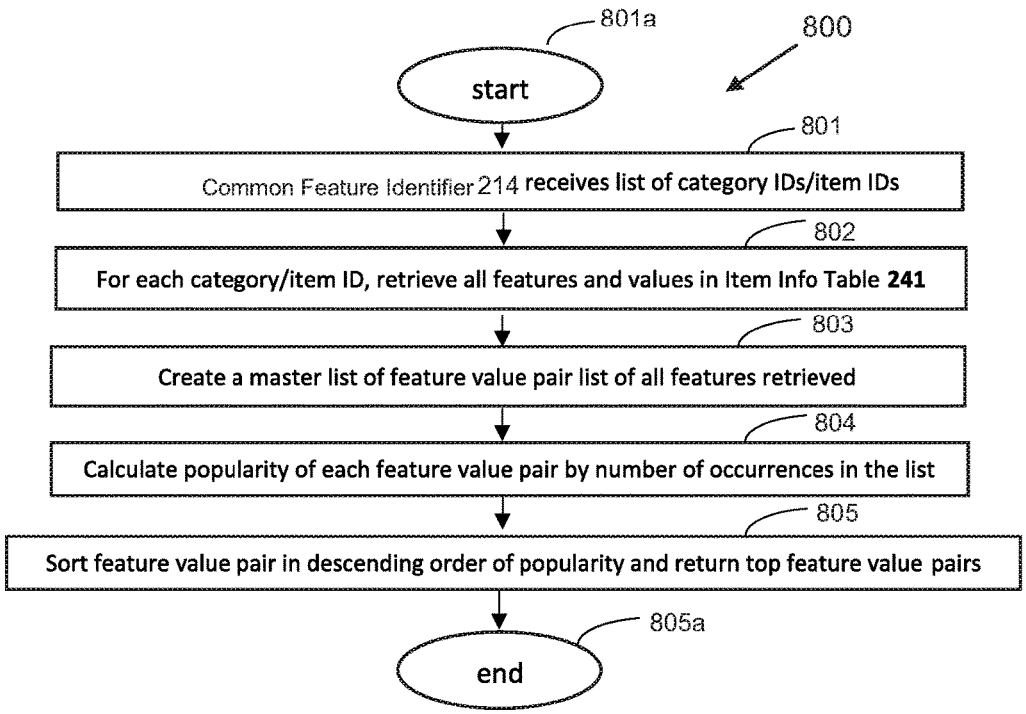
FIG. 14 shows a flow chart of a control flow of common item feature identification process, which is typically executed by one or more computer processors, in accordance with computer software stored in one or more computer memories, in accordance with an embodiment of the present invention.

FIG. 14 shows a flow chart 800 of a control flow of common feature identifier process, which is typically executed by one or multiple computer processors, in accordance with computer software stored in computer memory or memories, in accordance with an embodiment of the present invention. The flow chart 800 includes steps 801a, 801-805, and 805a.

Figure 15:
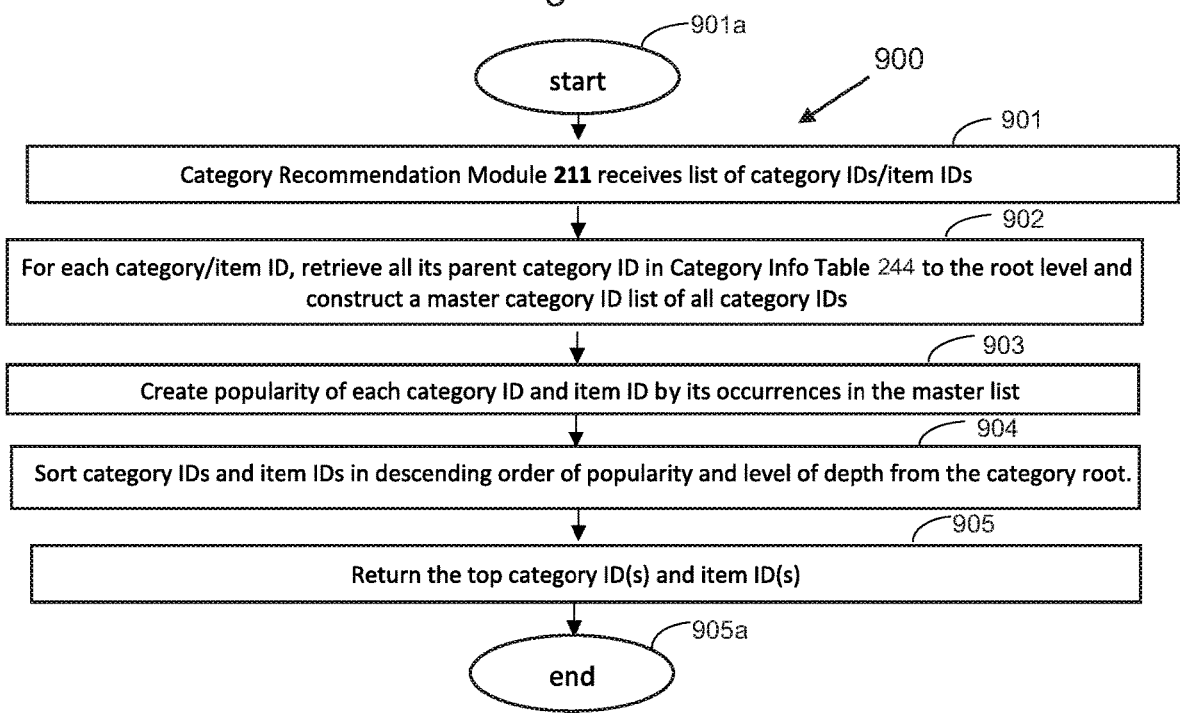
FIG. 15 shows a flow chart of a control flow of extraction category recommendation module, which is typically executed by one or more computer processors, in accordance with computer software stored in one or more computer memories, in accordance with an embodiment of the present invention.

FIG. 15 show a flow chart 900 of a control flow of category recommendation module, which is typically executed by one or more computer processors, in accordance with computer software stored in one or more computer memories, in accordance with an embodiment of the present invention, such as computer memories of bank of computer servers or processors 30, in accordance with an embodiment of the present invention. The flow chart 900 includes steps 901a, 901-905, and 905a.

FIG. 16 shows an example of an item info table 241, in accordance with an embodiment of the present invention, which may be stored in one or more computer memories and/or disks by one or more computer processors, in accordance with an embodiment of the present invention, in the bank of computer servers or processors 30.

FIG. 17 shows an example of a manufacturer table 242, in accordance with an embodiment of the present invention, which may be stored in one or more computer memories and/or disks by one or more computer processors, in accordance with an embodiment of the present invention, in the bank of computer servers or processors 30.

FIG. 18 shows an example of a brand table 243, in accordance with an embodiment of the present invention, which may be stored in one or more computer memories and/or disks by one or more computer processors, in accordance with an embodiment of the present invention, in the bank of computer servers or processors 30.

FIG. 19 shows an example of a category info table 244, in accordance with an embodiment of the present invention, which may be stored in one or more computer memories and/or disks by one or more computer processors, in accordance with an embodiment of the present invention, in the bank of computer servers or processors 30.

FIG. 20 shows an example of an expert info table 251, in accordance with an embodiment of the present invention, which may be stored in one or more computer memories and/or disks by one or more computer processors, in accordance with an embodiment of the present invention, in the bank of computer servers or processors 30.

FIG. 21 shows an example of a user info table 231, in accordance with an embodiment of the present invention, which may be stored in one or more computer memories and/or disks by one or more computer processors, in accordance with an embodiment of the present invention, in the bank of computer servers or processors 30.

FIG. 22 shows an example of a review record table 252, in accordance with an embodiment of the present invention, which may be stored in one or more computer memories and/or disks by one or more computer processors, in accordance with an embodiment of the present invention, in the bank of computer servers or processors 30.

FIG. 23 shows an example of a categorized image table 246, in accordance with an embodiment of the present invention, which may be stored in one or more computer memories and/or disks by one or more computer processors, in accordance with an embodiment of the present invention, in the bank of computer servers or processors 30.

FIG. 24 shows an example of a temporary image table 261, in accordance with an embodiment of the present invention, which may be stored in one or more computer memories and/or disks by one or more computer processors, in accordance with an embodiment of the present invention, in the bank of computer servers or processors 30.

FIG. 25 shows an example of a copyright record table 245, in accordance with an embodiment of the present invention, which may be stored in one or more computer memories and/or disks by one or more computer processors, in accordance with an embodiment of the present invention, in the bank of computer servers or processors 30.

Figure 26:
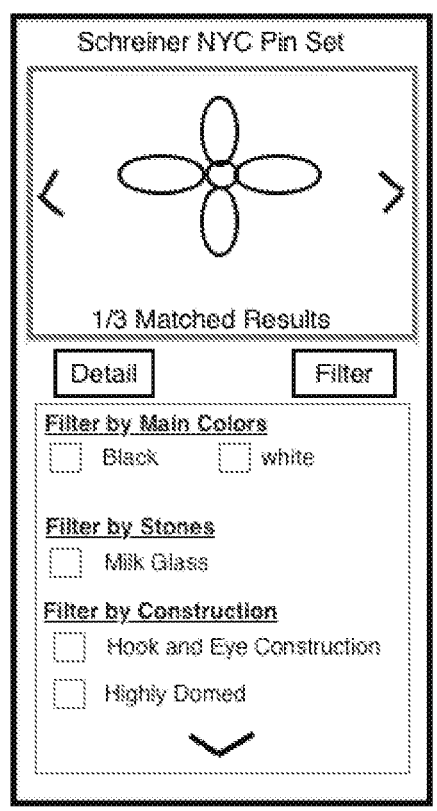
FIG. 26 shows a web application display of an image identification result.

FIG. 26 shows a screen display of image identification results.

Figure 27:
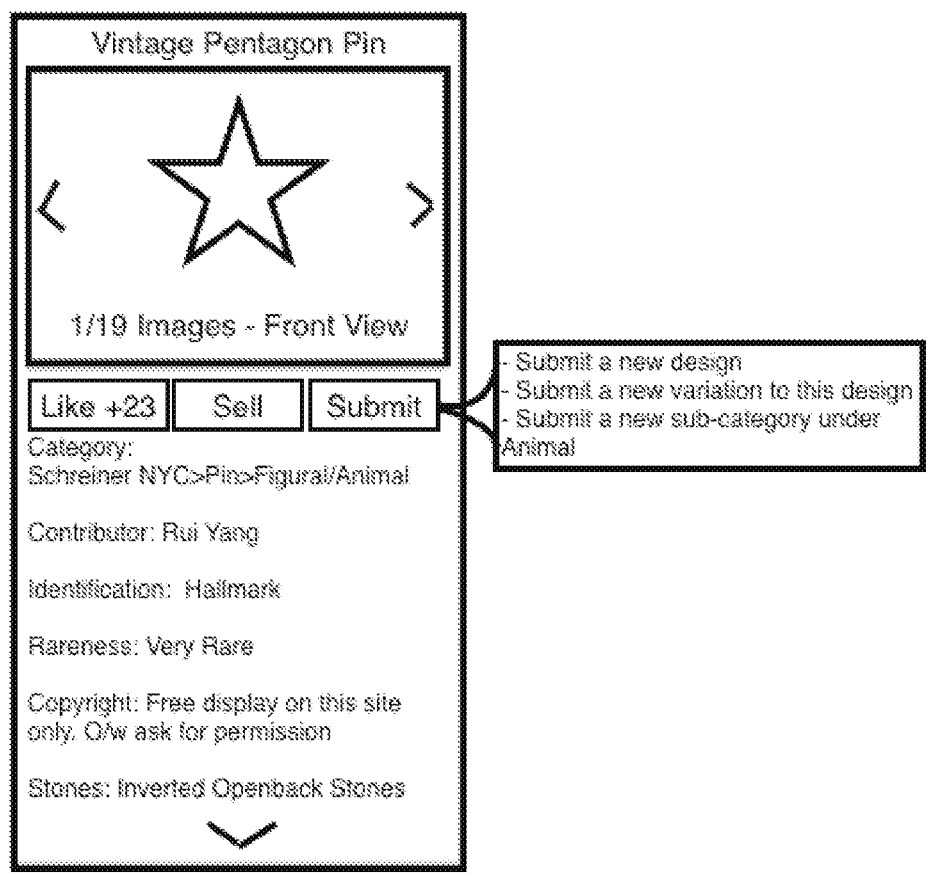
FIG. 27 shows a web application display of item details.

FIG. 27 shows a screen display of item details.

A configuration of one or more embodiments of the present invention is comprised of three sub-systems and four databases as shown in FIG. 1. The three systems, each of which may include systems, apparatus and methods, include Image Identification System 22, Knowledge Collection System 21 and Online System 10. Each of systems 22, 21, and 10 may include apparatus and methods, and may be implemented by one or more computer processors executing computer software stored in one or more computer memories, of for example a matrix of computer servers, such as bank of computer servers 30 in FIG. 1.

"Cloud" or "cloud ecosystem" is a widely used term to describe a bank of computer servers connected through internet, usually for complex data computing.

In at least one embodiment of the present invention, heavy data processing and machine learning means most likely, to achieve reasonable performance, the system, apparatus, and/or method 1 typically needs to run on a Cloud (big data) where a matrix of computer servers connected through internet 11, such as cloud 30 are programmed to work together with data and process distributed among thousands of machines and further this can be executed in parallel.

System 22, 21, 10 access data stored in databases and communicate with each other via internet 11.

In alternative embodiments, device 12 may be a personal computer having a computer processor, computer memory, and a user interactive device such as a computer mouse. Device 13 may be a smart phone such as an Iphone (trademarked). Device 14 may be a tablet computer such as an Ipad (trademarked). Device 15 may be a laptop computer.

Devices 12-15 communicate with System 10 through internet 11.

Image Identification System 22 may extract image features and use the image features to match an inquiry image with categorized items stored in Knowledge Base or database 24. Knowledge Collection System 21 is programmed by computer software, stored in one or more computer processors, such as on one or more computer servers in a matrix of computer servers 30 shown in FIG. 1, to manage all processes related to user information contribution, expert review, and information admitted to Knowledge Base or database 24. Online System 10 handles general services between a user and the overall system and method.

One embodiment of Image Identification System 22 involves the extraction of Scale Invariant Feature Transform (SIFT) image features, which refer to SIFT, and which are incorporated herein by reference. The use of SIFT, in at least one embodiment, yields the best result in terms of precision and recall. SIFT image features work well in matching historical images and items of the same design in different colors. The SIFT method's abilities to ignore scale and rotation, plus low requirements in the number of training images, allow rare items with limited historical images to be matched with today's images even taken from different angle or at different scale.

To support both text search and image search, in at least one embodiment, all images entering the system 1 will have image features extracted by Image Identification System 22 and stored in Temporary Image Table 261 shown in FIG. 5. Original image data and other textual descriptive parameters of the image are also saved into the table 261. Once a contribution is approved to be a new design under a category (or a new variation of a known design, a new design to a known category, or a new sub-category), the record would be stored in Categorized Image Table 246 if it is a new sub-category, or in Item Info Table 241 if it is a new design or a new variation to an existing design, and all related data would be removed from Temporary Image Table 261. Image matching/identification based on image features is used by multiple sub-systems for different purposes. To reduce the workload and potential amount of errors, Knowledge Collection System 21, shown in FIG. 1, is programmed to call Image Identification System 22 for each submitted image and evaluates its uniqueness and similarity to categorized images in Knowledge Base 24 before assigning its review to experts. This process is called "pre-validation". Duplicate or irrelevant images detected during pre-validation, in at least one embodiment are not saved into any database. During review, categorized items with images similar to user-contributed images are used as reference for experts. For image-based search, Online System 10 calls Image Identification System 22 to find the top-matched antique/collectable items based on the similarity of images' features between inquiry image and images of categorized items in Knowledge Base or database 24.

Another group of methods widely used in one or more embodiments of the present invention are Natural Language Processing (NLP) related. NLP methods are mainly used in two aspects. The first aspect is to pre-process all textual input data, either submitted via devices 12-15 or acquired from third party data source, is to eliminate typos and improve quality and consistency before the textual input date is stored in any database of databases 23, 25, 26, and 24, and/or other databases of system, apparatus, and/or method 1 of FIG. 1. During pre-processing, NLP related data cleansing methods such as word standardization, spelling correction, removal of stop words, etc. are used. The second aspect of NLP methods used, is data comparison and matching based on text.

Due to the limits of technology and the potentially poor quality of input images, an image search usually returns multiple matching results. When textual input data is available for the same inquiry item, after receiving top matched results based on image feature similarity from Image Identification System 22, the caller systems (Online System 10 or Knowledge Collection System 21), as implemented by one or more computer processors in the Cloud, calculate and sort top-matched results based on textual similarity scores between the textual descriptive parameters of the inquiry item and top-matched results to further improve the search results' accuracy and eliminate irrelevant results. During textual data comparison, NLP methods such as Part of Speech (POS) Tagging, Noun Phrase Identification, Entity Spotting, etc., which are generic NLP methods that are widely used by the industry by those skilled in the art, can be used to extract critical relevant key words from the parameters, and a key word can be compared using methods such as Levenshtein, Overlap coefficient, etc. Similar NLP methods can be used during text-based search to find top-matched categorized items based on similarities between search term and textual parameters of all categorized items in the Knowledge Base 24.

Knowledge Base 24, as shown in FIG. 6 stores critical validated/reviewed information collected from different sources. The antiques/collectables data set, covers from category to each detailed design with features described in text, image features extracted, and original images from different angles, and can be used to build an e-commerce system, a search system, an education system, social forums or references for content publishers, traditional antiques stores and schools. The knowledge database 24, shown in FIG. 6, includes an Item Info Table 241, a Manufacturer Table 242, a Brand Table 243, a Category Info Table 244, a Copyright Record Table 245, and a Categorized Image Table 246.

Manufacturer Table 242 is part of the Knowledge Base or database 24. As shown in FIG. 17, table 242 stores the background information of each manufacturer and categories of items it produces.

Brand Table 243 is part of the Knowledge Base or database 24. As shown in FIG. 18, it stores the background information of each known brand and categories of items produced in that brand name.

Category Info Table 244 is part of the Knowledge Base or database 24. As shown in FIG. 19, table 244 stores all details of each category in a tree structure. The root categories are the main kinds of antiques/collectables used by most online auction sites. Each category has a unique ID, name, textual descriptive parameters that can be used for text search and display, and an image ID list that points to image records stored in Categorized Image Table 246, and an example of which is shown in FIG. 23. In at least one embodiment, each category may have multiple levels of sub-categories.

Item Info Table 241, an example of which is shown in FIG. 16, stores detailed information about each unique design variation, called an "item" in one or more embodiments of the present invention. Each item belongs to a category in Category Info Table 244, an example of which is shown in FIG. 16. The manufacturer and brand name of an item may be unknown due to historical reasons. As shown in FIG. 16, besides basic information such as a unique item ID (identification), name, category ID, brand ID, manufacturer ID etc., each item also typically has two groups of information. One group is text descriptive parameters that use text or numbers to describe the weight, size, color, etc. of the item. This group can be displayed on an item detail page, used by a user for study and identification, and can also be used for a text-based search. The other group is a list of image IDs in Categorized Image Table 246, an example of which is shown in FIG. 23. All images of each item in Item Info Table 241, as shown in FIG. 16, in at least one embodiment are previously verified by experts with image features extracted and stored in Categorized Image Table 246 in FIG. 23 for a search based on image identification.

Temporary Image Table 261, show in FIG. 5, and Categorized Image Table 246, shown in FIG. 6, both store basic image information and extracted image features. All images entering the system will typically first be stored in Temporary Image Table 261 shown in FIG. 5. In at least one embodiment, when an image search is concluded, the inquiry image submitted by user is deleted. Once a review of a user contribution is concluded and the contribution is valid, corresponding image records are transferred from Temporary Image Table 261, shown in FIG. 5, to Categorized Image Table 246 with the new item ID. Otherwise, in at least one embodiment, all image records of the contribution will be deleted from Categorized Image Table 246, shown in FIG. 24, and Temporary Image Table 261 shown in FIG. 26.

As a starting point, most static text data in Category Info Table 244 in FIG. 19, Brand Table 243 in FIG. 18, and Manufacturer Table 242 in FIG. 17 can be acquired from publicly available information. Images of items can be purchased or donated/shared by image owners. During the initial stage, manual data collection and paid data acquisition, in at least one embodiment, may be the main methods to grow the knowledge base or database 24. But gradually, the expert-reviewed user contribution system shall become the major collection method. Good management of data sources and copyright history is important to the success of one or more embodiments of the present invention.

The Online Service System 10 handles user's service requests submitted from a Web application or a Web browser residing in one of devices 12-15 in FIG. 1, and display of corresponding results, on a computer monitor such as on one of devices 12-15. As shown in FIG. 2, the software modules of online service system and/or computer software 10, that directly support these functions are Web server 102 and Page generator 104. There are software modules to validate user login, such as User Authentication Module 103.

User Authentication Module 103 is executed by one or more computer processors in the cloud 30 of system 1 of FIG. 1, to search User Info Table 231 with a user ID or the user's email and the user's password to determine if the user is valid and to return the validation result.

As shown in FIG. 21, User Info Table 231 stores information regarding each user, including system access information (login, password and access recovery email address), image Identification request history, and contribution history including a user's contributions, status, and conclusions of each contribution.

Page Generator 104, of system 10, shown in FIG. 2, is a software module, executed by one or more computer processors in the cloud 30, in accordance with the present invention, that generates a web page or code and data for a web application based on service request information and device/browser parameters in an http request sent from the user's browser or web application. The result is sent back through Internet 11.

Antiques/Collectables Knowledge Collection System 21, or "Knowledge Collection System", as executed by one or more computer processors in the cloud 30, is in charge of all processes relating to the collection, review and maintenance of antiques/collectables related information. As show in FIG. 3, there are three process managing software modules: Contribution Manager 212, Review Manager 213, and Copyright Manager 215. Category Recommendation Module 211 and Common feature identifier 214 are software modules helping to improve accuracy of identification when multiple similar items are found. The needed data are Expert Info Table 251, and Review Record Table 252 in Review Database 25, shown in FIG. 7, and Item Info Table 241, Copyright Record Table 245, and Category Info Table 245 shown in FIG. 6, in Knowledge Base or database 24.

Expert Info Table 251 stores two types of information for each expert. As shown in FIG. 20, parameters include an expert's assignment(s), current assignment status, progress, and final result. In one or more embodiments of the present invention, experts are the main workforce to secure the accuracy of information in Knowledge Base 24.

Review Record Table 252 stores information related to contribution reviews. As shown in FIG. 22, the table 252 includes basic information of the contribution, including contributor's user ID in User Info Table 231 and submitted time. The table 252 also stores all information submitted by the contributor, including parameters, background information, and a list of images IDs to Temporary Image Table 261. Each assignment of the review is saved under the Review Records section, which includes information such as each assigned expert's ID, status, and input from each expert.

Copyright Record Table 245, an example of which is shown in FIG. 25 is part of the Knowledge Base or database 24. As shown in FIG. 25, the database 245 stores electronic copies of copyright-related documents signed off by the user when he or she contributes an item. The table 245 also stores the contributor's user ID, copyright sign off time, review ID and list of image IDs that this copyright covers.

Copyright Manager 215 of system 21, shown in FIG. 3, is a software module that manages the process of collecting copyright-related information during the user contribution process. As shown in FIG. 9A, when a user submits a request to contribute information related to a new item/category, Copyright Manager 215 would be the first module called. Page Generator 104 of system 10, is called to generate related legal information that would be displayed to the user to confirm that he or she owns copyright of all images about to be submitted for this item and grants permission to the system to display the images for free. Once a user signs off, the electronic copy is saved into Copyright Record Table 245 of knowledge base 24 with a unique copyright ID. Aside from temporary image search inquiry images, in at least one embodiment, copyright ID is required and saved to each image record in Temporary Image Table 261 shown in FIG. 5, or Categorized Image Table 246 also shown in FIG. 5, of knowledge base 24 if the item is categorized and admitted to Knowledge Base 24.

Contribution Manager 212 is a software module in Knowledge Collection System 21, shown in FIG. 3, that, as executed by one or more computer processors in the cloud 30, controls the process of user's knowledge contribution until the information is pre-validated and entered into official review process. An efficient, smooth, and encouraging user contribution process is key to grow the knowledge base and the success of a system based on this invention. And in one or more embodiments of the present invention, SIFT features based image identification is used to automatically detect duplicates of existing items thus to reduce workload of expert review and avoid potential copyright issue(s).

Review Manager 213 of the system and method 21 shown in FIG. 3, is a software module, executed by one or more computer processors in the cloud 30, that manages, in at least one embodiment, the whole process of expert review. As mentioned above, before review starts, one or more computer processors executing Review Manager 213, will pre-validate user submissions and eliminate duplicates based on image identification with categorized items. Also, to streamline the review process, Review Manager 213, in at least one embodiment, is programmed to automatically assign reviews based on expert's expertise, track review progress, evaluate review quality, and conclude reviews based on the input of all experts.

Category Recommendation Module 211 receives a list of category/item IDs. This list of IDs might contain duplicates since there can be multiple images of different views of the same item/category in the top matched image list. Module 211 then calculates and returns the most popular category/item IDs among the input. This module is called by Image Identifier 222 of system 22 shown in FIG. 4, to identify the most likely matched category and item when there are multiple images matched with a high similarity score. As shown in FIG. 15, the module first separates the input into 2 different lists: an item ID list and a category ID list. For each item ID, the module 211 gets each item ID's direct category ID from Item Info Table 241 and adds the direct category ID to the category ID list. Next, for each category ID in the category ID list, the module 211 finds all parent category IDs to root level and add different levels of category IDs to the category ID list. At last, the module 211 calculates popularity score based on each category ID's occurrences in category ID list, sorting the category ID list in descending order of popularity score, then by level of depth from root. This way the most popular and specific (close to leaf level) category ID would be identified. The module 211, as executed by one or more computer processors in the cloud 30, also sorts the item ID list based on popularity and return the most popular item ID(s). When an item/category's ID appears multiple times in the input list, it means multiple images from this item or category have matched the inquiry image(s). Higher number of matches indicate a stronger similarity between the item/category and the inquiry item(s). When an item/category's ID appears multiple times in the input list, it means multiple images from this item or category have matched the inquiry image(s). Higher number of matches indicate a stronger similarity between the item/category and the inquiry item.

Common Feature Identifier 214, shown in FIG. 3 receives a list of category/item IDs, then calculates and returns the most common feature/parameter value pairs among the inputs. This result reflects the most common characteristics among the input items and can be used to filter a list of items. As shown in FIG. 14, the Identifier 214 first fetches list of parameters/feature-value pairs for each item ID in Item Info Table 241 shown in FIG. 6, or category ID in Category Info Table 244 also shown in FIG. 6. Next, the identifier 214 calculates for each feature-value pair's popularity based on occurrences among all the pairs. Finally, the identifier 214 sorts feature-value pairs in descending order based on popularity and return the most popular ones as result. Examples of the results can be "Main Stone: Keystone", "Shape: Domed".

The process of user contribution submission starts on any detail page as steps 302, 303 or 304 shown in the flow chart of FIG. 9A. On a detail page of each category or item, as shown in FIG. 27, there is a "Submit New" button. When the "Submit New" button is clicked, sub-menus will be shown which includes "Submit New Sub-category", "Submit a new design" and "Submit a new variation of this design". When "Submit New Item" button is clicked, Contribution Manager 212 is informed to start the contribution process. As shown in FIGS. 9A-9B, the manager 212 first calls Copyright Manager 215 to handle copyright-related information collection. Once the user acknowledges the ownership of the images he's about to submit and has signed the document to allow the system to display and process the images, Copyright Manager 215 of FIG. 3 saves all related documents into Copyright Record Table 245 shown in FIG. 6, and notifies Contribution Manager 212 shown in FIG. 3. Next, Contribution Manager 212 shown in FIG. 3, tells Page Generator 104 shown in FIG. 2, to generate initial front image upload page. The generated page then will be sent to a web application or a browser of one or more of devices 12-15 to display on a computer monitor of one or more of devices 12-15.

To reduce the impact of duplicate or irrelevant submissions, pre-validation will validate if any image is identical or completely irrelevant to existing item images. In at least one embodiment, image identification of an item's front image is the first and most important step of the whole pre-validation process.

Once the user uploads the front image of an item, Web server 102, such as one or more of the cloud 30 of FIG. 1, will notify Contribution Manager 212 with the uploaded image file. The manager 212 will save it into database table Temporary Image Table 261 with the copyright ID generated at step 306. At step 308 the contribution manager 212 saves the inquiry image into temporary image table 261 with copyright ID. The manager 212 is also programmed to fetch a list of image IDs in Item Info Table 241 using the category/item ID where the user submitted the request as reference images for similarity evaluation. Next, the inquiry image ID and a list of reference image IDs will be sent to Image Identifier 222 at step 309. Image Identifier 222 calculates and returns similarity scores between the inquiry image and reference images, at step 310 of FIG. 9A. When all similarity scores are low, the inquiry image is irrelevant to the category or item. When similarity scores are too high, the inquiry image can be a duplicate to reference images. In both cases, Contribution Manager 212 will tell Page Generator 104 to generate an error message and send to the Web app so that the user can correct the mistake at step 312 of FIG. 9A. The errored inquiry image will be removed immediately from Temporary Image Table 261 at step 311 of FIG. 9A.

When the inquiry image's similar scores to reference images are above a threshold but with difference, the inquiry item is similar to the item but not a duplicate as determined at step 310a, and process from step 310a (answer yes) from FIG. 9A to FIG. 9B. Contribution Manager 212 will ask the user to upload the rest of their images, at step 313 of FIG. 9B. Then for each newly submitted image, one or more computer processors in the cloud 30 executing the contribution manager 212 repeats the above procedure, at steps 314, 315, 316, 316a, 317, and 318. When all images uploaded are validated, Contribution Manager 212 tells Page Generator 104 to generate a page for textual supplemental information regarding the item such as size, weight, color, history etc. at step 319 of FIG. 9B. Once the user finishes, after basic validation of the input, Contribution Manager 212 will conclude the pre-validation and information collection process by notifying Review Manager 213, at step 323 in FIG. 9B, with image IDs of submitted images, reference category/item ID, and other user input information. This will kick off the review process of the contribution. The pre-validation of contribution of a new sub-category or a new variation of an item is similar to above pre-validation of contribution of a new item.

Upon receiving notification from the Contribution Manager 212 that the contribution has passed pre-validation, Review Manager 213 of system 21 shown in FIG. 3, will start the reviewing process as shown in FIGS. 11A-11B. Review Manager 213 is a software module in Knowledge Collection System 21, shown in FIG. 3, that controls the review process of user-submitted contributions.

As shown in FIGS. 11A-B, when user-submitted information passed the pre-validation, Contribution Manager 214 will notify Review Manager 213 at step 501 shown in FIG. 11A. The manager 213 saves all submitted text information and the list of image IDs into a new review record in Review Record Table 252, an example of which is shown in FIG. 22, as shown by step 503 of FIG. 11A.

Next, at step 503, the Review Manager 213 will update the user's contribution list in User Info Table 231, shown in FIG. 21, with the new contribution. At the same time, Review Manager 213 uses the reference category/item ID to search Expert Info Table 251, at step 504 of FIG. 11A, for currently available experts whose expertise covers the category/item. The manager 213 then selects X number of experts and adds the review to Assignment List in their expert record in Expert Info Table 251 with assignment status set to "assigned", at step 505 and step 506. Next, each expert will be notified of the assignment at step 507. Experts can review the assignment and decide to either "accept" or "decline" the assignment. Experts' decisions will be updated into Review Record Table 252, an example of which is shown in FIG. 22, and experts' records into Expert Info Table 251, an example of which is shown in FIG. 20. When an assignment is declined, at steps 508a, 509, and 511, Review Manager 213 will find the next available expert, at step 511, and repeat above process, by looping back to step 505 of FIG. 11A, until all assignments are accepted.

Once an expert accepts an assignment, at steps 508a, 510, he can start reviewing user input information stored in Review Record Table 252, shown in FIG. 22, and images in Temporary Image Table 261, shown in FIG. 24. The output of a review includes two parts. First is the expert's conclusion of the review, which can be invalid, duplicate, insufficient, valid additional info to existing category/item, or a new category/item/variation. Second, in the last two cases, an expert can edit the user's input by adding more information, demanding more information, or correcting mistakes. An expert review can be done through an online GUI system or offline text message. When an expert finishes a review, he can submit the result and the status of the review record in Review Record Table 252, shown in FIG. 22, will be marked "submitted".

Review Manager 213 will periodically check the status of all assignments, at step 512, and send a reminder to assigned experts whose assignments are still in progress. Once all participated experts' assignments are marked "submitted", Review Manager 213 extracts the conclusion from each expert's review record and checks to see if a majority of experts reached an agreement at step 512b. If not, a special manual disagreement handling process will be kicked off, at step 513. Otherwise, the manager 213 is programmed to check if the conclusion is among invalid, duplicate, or insufficient information at step 512c. If so, the manager 213 will clean up the submitted information from the overall system by removing submitted images from Temporary Image Table 261, shown in FIG. 24 and from the copyright record in 245, shown in FIG. 25.

If the contribution is "valid additional info to existing category/item", the information is updated to corresponding category record in Category Info Table 244, shown in FIG. 19 or/and the item record in Item Info Table 241 in FIG. 16. For a new category, a new record will be created in Category Info Table 244 with all the information submitted by user and edited by experts. Similarly, a new item would be saved into Item Info Table 241. Image features of submitted images will be moved to Categorized Image Table 246 from Temporary Image Table 261. New variation to a categorized item is treated as a new item.

Finally, Review Manager 213 updates the review status in Review Record Table 252 of the record and assignment status in each expert's record in Expert Info Table 251 for this assignment to "finished", at steps 519 and 520. The Review Manager 213 will also update the user's contribution status in User Info Table 231 with the conclusion at step 521, and then the process of FIGS. 11A-B ends at step 521a.

Image Identification System 22 is in charge of image feature extraction and identification processes. As shown in FIG. 4, it includes software modules Image Feature Extractor 221 and Image Identifier 222. The needed data are Temporary Image Table 261 shown in FIG. 24, and Categorized Image Table 246 shown in FIG. 23 in Images Database 26, shown in FIG. 5.

In this invention, to preserve image copyright, only images with copyright permission would be stored in database permanently with the corresponding copyright record ID. All other images would be removed once they are no longer needed.

As stated above, one or more embodiments of the present invention use SIFT image features. Image Feature Extractor 221 of image identification system 22 shown in FIG. 4, is the software module implemented based on one of the invariant image feature extraction methods. As shown in FIG. 13, when Image Feature Extractor 221 is called with an image ID, at step 701, the extractor 221 first fetches the image from Temporary Image Table 261 in the image database 26 shown in FIG. 5. Then at step 702, the extractor 221 detects SIFT keypoints in the image. Each keypoints contains attributes such as coordinates, size of meaningful neighborhood, orientation etc. Next, the extractor 221 computes descriptors based on the keypoints. Finally, the extractor 221 stores the SIFT keypoints and SIFT descriptors in the image's record in Temporary Image Table 261 of image database 26 to be used for identification.

When there is a request for image identification, the request is sent to Image Identifier 222 of image identification system 22 with the inquiry image and list of reference image IDs. As shown in FIG. 12, Image Identifier 222 first calls Image Feature Extractor 221, at step 601, to extract image features of the inquiry image, then fetches image features of each reference image ID from Categorized Image Table 246. (In case no reference is specified, all images in Categorized Image Table 246 will be used as references). Next, image identifier 222 calculates the image similarity score between image features of the inquiry image and those of each reference image, at step 602. When similarity scores are generated between each reference image ID and the inquiry image, the top matched image IDs with scores above threshold will be returned with similarity score.

As shown in FIGS. 10A-10B, when a user submits a photo for image searching in the system, at step 401, through Web app or Web browser, at step 402, the Web server 102 first calls User Authentication Module 103, at step 403 to validate the login information. If the login is valid, at steps 404, and 404b, the Web server 102 will pass the inquiry image to Image Identifier 222 for identification at step 405. (see Image Identifier 222 and FIG. 12 for the process of image identification) With no reference category/Item ID, the Image Identifier 222 will try to find a match among all images in Categorized Image Table 246 and return ID(s) of image with similarity score above threshold, at step 407

When multiple images are returned, at step 408, Web server 102 calls Category Recommendation Module 211 to calculate and return the most likely category/item IDs based on category/item IDs among returned images. Web server 102 also calls Common Feature Identifier 214 to calculate the most common feature-value pairs among the categories/items of returned images, at step 409. Next, results of Category Recommendation Module 213 and Common Feature Identifier 214 will be sent to Page Generator 104 to generate the search result page and send to Web app or Browser for display, at step 411.

As shown in FIG. 26, on the search result page, the front view image of the best matched category/item ID is shown in the center. The user can scroll through images of top matched category/item IDs. Above the image is the name of this shown category/item, and a detail button which will bring the user to the detail page of this category/item. There's also a "Filter" button, which will expand a sub panel with common feature-value pairs shown as checkboxes that can be checked/unchecked in order to filter the results.

When user clicks "Details" button, the details of current shown item will be displayed on the screen, as shown in FIG. 27. Besides details such as category, construction of the piece, materials used, designer/manufacturer, possible year of built, identification method and copyright related information, the details page also contains a "Like" button and a "Sell" button. When user clicks "Like" button for the first time, the counts next to the "Like" button will increase by one to dynamically reflect people's interest in the design. When user clicks "Sell" button, a page will be shown that allows user to sell his/her item similar to the shown piece.

Data in Knowledge Base 24 can integrate with other data sets and provide enriched information to end users. For instance, on the details page of each item or category, in addition to textual description and images, recent sales records and other price and volume related information would also help user to understand pricing and item popularity trend.

This invention uses SIFT image features for image identification, there are other scale and rotation invariant image feature extraction method such as Speed-Up Robust Features (SURF), or Oriented FAST and Rotated BRIEF (ORB) that can also be considered.

To improve user's confidence in copyright protection, automatic image watermarking with user's preferred label might be an efficiently way to prevent piracy.

Use monthly service quota to control free usage of system and allow user to purchase additional service quote can generate income to cover maintenance of the system and payment to experts.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

We claim:

1. A method comprising the steps of:
generating a knowledge base in a database, of one or more computer processors, the knowledge base comprised of a plurality of fields, wherein a first field of the plurality of fields of the knowledge base specifies a plurality of known brands of a plurality of known items, wherein a second field of the plurality of fields specifies a plurality of known categories corresponding to the plurality of known items, wherein a third field of the plurality of fields specifies a plurality of sets of known image-based parameters of the plurality of known items;
wherein a fourth field of the plurality of fields specifies a plurality of sets of known text based description parameters of the plurality of known items;
receiving in one or more computer memories an inquiry image and textual descriptive parameters for the inquiry image;
determining, by one or more computer processors, a plurality of matched item identifications which match the inquiry image with a first plurality of the plurality of known items;
determining, by one or more computer processors, a plurality of matched category identifications which match the inquiry image with a first plurality of known categories;
and further comprising sorting the plurality of matched item identifications and the plurality of matched category identifications, based on the following:
for each matched item identification of the plurality of matched item identifications, retrieving a corresponding category identification from a table in computer memory and adding the corresponding category identification to a category list in computer memory;
for each category identification in the category list, finding all corresponding parent category identifications in computer memory to a root level and adding a plurality of corresponding different levels of category identifications to the category list in computer memory;
determining a category identification popularity score based on each category identification's occurrences in the category identification list,
analyzing inputs, by one or more computer processors, to determine if the inputs satisfy predetermined pre-validation criteria for one or more of the plurality of known brands, one or more of the plurality of known categories, and one or more of the plurality of known image-based parameters thereby eliminating duplicates based on image identification with categorized items;
sorting the category identification list in computer memory in descending order of popularity score, then by level of depth from the root level, and specific category identification for the inquiry image is identified in computer memory; and
sorting the plurality of item identifications based on popularity, and identifying in computer memory the most popular item identification of the plurality of item identifications as the item identification match for the inquiry image;
selecting one of more experts, by a review manager computer module which is programmed to search an experts table to find the one or more experts in response to receiving the inputs;
accepting a review task of determining whether the inputs are acceptable, wherein the one or more experts are assigned by the review manager computer module to determine whether the inputs are acceptable; and
storing, by one or more computer processors, results of review task and a status of the review in a review record table.

2. The method of claim 1 wherein
if one or more of the inputs satisfy predetermined pre-validation criteria having one or more experts in one or more fields related to the inputs, analyze the plurality of inputs through the internet and through one or more computer processors, and if the one or more experts determine that the inputs are acceptable, storing the plurality of inputs for one or more of the plurality of known brands, one or more the plurality of known categories, and one or more of the plurality of sets of known image-based parameters of the plurality of known objects in the database, and if the one or more human experts determine that the inputs are not acceptable, not storing the plurality of inputs in the database.

3. The method of claim 1 further comprising
using one or more computer processors to transfer one or more signed copyright permission documents of one or more images corresponding to the plurality of sets of known image-based parameters; and
wherein the one or more signed copyright permission documents are produced by a copyright manager computer module programmed to request a user to sign a copyright form in response to submission of a design via a computer application, and if a user signs the copyright form online to form a signed copyright permission document, the computer manager computer module is programmed to save each signed copyright permission document, of the one or more signed copyright permission documents, in a copyright record table in the knowledge base.

4. An apparatus comprising
one or more computer processors; and
one or more computer memories;
wherein the one or more computer processors are programmed by computer stored in the one or more computer memories to execute the steps of:
generating a knowledge base in a database, by use of the one or more computer processors, the knowledge base comprised of a plurality of fields, wherein a first field of the plurality of fields of the knowledge base specifies a plurality of known brands of a plurality of known items, wherein a second field of the plurality of fields specifies a plurality of known categories corresponding to the plurality of known items, wherein a third field of the plurality of fields specifies a plurality of sets of known image-based parameters of the plurality of known items, wherein a fourth field of the plurality of fields specifies a plurality of sets of known text based description parameters of the plurality of known items;
receiving in the one or more computer memories an inquiry image and textual descriptive parameters for the inquiry image;
determining, by use of one or more computer processors, a plurality of matched item identifications which match the inquiry image with a first plurality of the plurality of known items;
and further comprising sorting the matched item identifications, based on the following:
for each matched item identification of the plurality of matched item identifications, retrieving a corresponding category identification from a table in computer memory and adding the corresponding category identification to a category list in computer memory;
determining a category identification popularity score based on each category identification's occurrences in the category identification list,
analyzing inputs, by one or more computer processors, to determine if the inputs satisfy predetermined pre-validation criteria for one or more of the plurality of known brands, one or more of the plurality of known categories, and one or more of the plurality of known image-based parameters thereby eliminating duplicates based on image identification with categorized items;
sorting the category identification list in computer memory in descending order of popularity score; and
sorting the plurality of item identifications based on popularity, and identifying in computer memory the most popular item identification of the plurality of item identifications as the most likely item identification match for the inquiry image;
wherein the step of generating the knowledge base in the database includes receiving a plurality of inputs via one or more computer processors, having one or more experts in one or more fields related to the inputs, analyze the plurality of inputs through the internet and through one or more computer processors, and if the one or more experts determine that the inputs are acceptable, storing the plurality of inputs for one or more of the plurality of known brands, one or more the plurality of known categories, and one or more of the plurality of sets of known image-based parameters of the plurality of known items in the database, and if the one or more experts determine that the inputs are not acceptable, not storing the plurality of inputs in the database; and
wherein a plurality of experts, which includes the one or more experts, are selected by a review manager computer software module which is programmed to search an experts table to find the plurality of experts in response to receiving the plurality of inputs;
wherein the plurality of experts are assigned by the review manager computer module the task of determining whether the inputs are acceptable; and
wherein the one or more experts, of the plurality of experts, accept the task of determining whether the inputs are acceptable, and wherein experts of the plurality of experts other than the one or more experts, decline the task of determining whether the inputs are acceptable; and further comprising:
selecting one of more experts, by a review manager computer module which is programmed to search an experts table to find the plurality of experts in response to receiving the inputs;
accepting a review task of determining whether the inputs are acceptable, wherein the plurality of experts are assigned by the review manager computer module to determine whether the inputs are acceptable; and
storing, by one or more computer processors, results of review task and a status of the review in a review record table.

5. The apparatus of claim 4 wherein
if one or more of the inputs satisfy predetermined pre-validation criteria having one or more experts in one or more fields related to the inputs, analyze the plurality of inputs through the internet and through one or more computer processors, and if the one or more experts determine that the inputs are acceptable, storing the plurality of inputs for one or more of the plurality of known brands, one or more the plurality of known categories, and one or more of the plurality of sets of known image-based parameters of the plurality of known objects in the database, and if the one or more experts determine that the inputs are not acceptable, not storing the plurality of inputs in the database.

6. The apparatus of claim 4 wherein
the one or more computer processors are used to transfer one or more signed copyright permission documents of one or more images corresponding to the plurality of sets of known image-based parameters; and
wherein the one or more signed copyright permission documents are produced by a copyright manager computer module programmed to request a user to sign a copyright form in response to submission of a design via a computer application, and if a user signs the copyright form online to form a signed copyright permission document, the copyright manager computer module is programmed to save each signed copyright permission document, of the one or more signed copyright permission documents, in a copyright record table in the knowledge base.

7. The method of claim 1 wherein
the one or more experts determine whether the plurality of inputs is already stored in the knowledge base, and if so one or more computer processors remove the inputs from a temporary image table.

8. The method of claim 4 wherein
the one or more experts determine whether the plurality of inputs is already stored in the knowledge base, and if so one or more computer processors remove the inputs from a temporary image table.

9. The method of claim 1
further comprising creating a new record based on the inquiry image data for the inquiry image which specifies a new category in the knowledge base if all of the one or more experts provide a conclusion that indicates that the inquiry image relates to a new category which is not one of the plurality of known categories.

10. The method of claim 4 further comprising
creating a new record based on the inquiry image data for the inquiry image which specifies a new item in the knowledge base if at least one expert is assigned the task of reviewing the inquiry image data for the inquiry image and wherein the new item specified in the knowledge base in the database is based on both the review of the inquiry image data by the at least one expert and the inquiry image data.

11. The method of claim 10 wherein
the at least one expert includes a plurality of experts; and
wherein before the step of creating a new record based on the inquiry image data for the inquiry image which specifies the new item in the knowledge base, all of the plurality of experts provide a conclusion that indicates that the inquiry image relates to a new item which is not one of the plurality of known items.

* * * * *